US008712809B2

(12) United States Patent
Krajcev et al.

(10) Patent No.: US 8,712,809 B2
(45) Date of Patent: Apr. 29, 2014

(54) METHOD FOR OLYMPIC EVENT HOSPITALITY PROGRAM MANAGEMENT

(75) Inventors: Dimitar Krajcev, Clifton, NJ (US);
Sead Dizdarevic, Far Hills, NJ (US);
Sanjin Karabegovic, New York, NY (US); Lisa Dooley, Bernardsville, NJ (US); Mirjana Garcia, Bedminster, NJ (US); Stephen Welch, Sparta, NJ (US);
Adam Wixted, Florham Park, NJ (US);
Elizabethe Miello, Hackettstown, NJ (US); Brian Mosteller, Chicago, IL (US)

(73) Assignee: Jet Set Sports Holdings, LP, Far Hills, NJ (US)

( * ) Notice: Subject to any disclaimer, the term of this patent is extended or adjusted under 35 U.S.C. 154(b) by 898 days.

(21) Appl. No.: 11/502,361

(22) Filed: Aug. 11, 2006

(65) Prior Publication Data

US 2007/0038503 A1   Feb. 15, 2007

Related U.S. Application Data

(60) Provisional application No. 60/707,146, filed on Aug. 11, 2005.

(51) Int. Cl.
*G06Q 10/00* (2012.01)
*G06Q 50/00* (2012.01)

(52) U.S. Cl.
USPC .................................. 705/5; 705/6; 705/26.1

(58) Field of Classification Search
USPC ................. 705/10, 1, 5, 6, 7, 8, 26, 1.1, 26.1; 725/13, 9
See application file for complete search history.

(56) References Cited

U.S. PATENT DOCUMENTS

| 7,116,211 | B1 | 10/2006 | Parker | 340/5.33 |
|---|---|---|---|---|
| 7,136,821 | B1 * | 11/2006 | Kohavi et al. | 705/5 |
| 7,155,424 | B2 * | 12/2006 | Ikezawa et al. | 1/1 |
| 2002/0016729 | A1 * | 2/2002 | Breitenbach et al. | 705/9 |
| 2002/0082877 | A1 | 6/2002 | Schiff et al. | 705/5 |
| 2002/0116235 | A1 * | 8/2002 | Grimm et al. | 705/5 |
| 2003/0061145 | A1 | 3/2003 | Norrid | 705/37 |
| 2003/0110063 | A1 * | 6/2003 | Among et al. | 705/6 |
| 2004/0030750 | A1 * | 2/2004 | Moore et al. | 709/204 |
| 2004/0039679 | A1 | 2/2004 | Norton et al. | 705/37 |

(Continued)

OTHER PUBLICATIONS

Annika Hinze and Agnes Voisard, Location—Time-Based Information Delivery in Tourism, Oct. 7, 2003, Springer Berlin/Heidelberg, vol. 2750/2003, 489-507.*

(Continued)

*Primary Examiner* — John Hayes
*Assistant Examiner* — Michael Harrington
(74) *Attorney, Agent, or Firm* — Pillsbury Winthrop Shaw Pittman LLP

(57) ABSTRACT

One aspect of the present invention is a method for effectively managing aspects of hospitality for an event. Event's may include Olympic (or other) event. An inventory of event hospitality items is acquired for the creation of hospitality program for client groups. Information from client's guest which make up the client group may be collected in order to identify which hospitality inventory items could best fulfill the client's needs and requests during the days of the event. Hospitality inventory items may include tickets, transportation, hotel, food/beverages, and event staff. Hospitality parameters may be established for each client group, wherein the parameters determine how hospitality inventory items should be allocated for the client group.

20 Claims, 67 Drawing Sheets

(56) References Cited

U.S. PATENT DOCUMENTS

| | | | |
|---|---|---|---|
| 2004/0059636 A1* | 3/2004 | McClung et al. | 705/26 |
| 2004/0073615 A1 | 4/2004 | Darling | 709/206 |
| 2004/0267567 A1* | 12/2004 | Barrera et al. | 705/2 |
| 2005/0033616 A1* | 2/2005 | Vavul et al. | 705/5 |
| 2005/0037747 A1* | 2/2005 | Geary et al. | 455/422.1 |
| 2005/0181765 A1 | 8/2005 | Mark | 455/411 |
| 2005/0234749 A1* | 10/2005 | Attebury et al. | 705/5 |
| 2005/0278206 A1 | 12/2005 | Choper et al. | 705/8 |
| 2006/0206610 A1 | 9/2006 | Ling et al. | 709/226 |
| 2006/0241983 A1* | 10/2006 | Viale et al. | 705/5 |
| 2007/0039024 A1 | 2/2007 | Krajcev et al. | 725/46 |
| 2007/0055554 A1 | 3/2007 | Sussman et al. | 705/5 |
| 2008/0052217 A1 | 2/2008 | Etkin | 705/37 |
| 2009/0125429 A1* | 5/2009 | Takayama | 705/35 |

OTHER PUBLICATIONS

"Canadian Olympic Committee and CoSport Launch Ticket Sales for Olympic Games in Athens." Canada NewsWire, May 15, 2003.*

* cited by examiner

Company Manager Home

LOG ON

USER NAME
PASSWORD

Home | Admin | Setup | Accounts | Timeline | Schedule | F&B | Rooms | Tickets | Transport | Guests | Staff | Employment

FIG. 7

| | PROGRAM MANAGER - MAIN SCHEDULE | | | | | |
|---|---|---|---|---|---|---|
| | Clients | | LDI Inc. | | | |
| | Jet Set Individual Guests | | | | | |
| Home | | | | | | |
| Programs | | | | | | |
| Client View | LDI Inc. | | | | | |
| Client Profile | | | | | | |
| F & B | | | | | | |
| Rooms | | | | | | |
| Transportation | | | | | | |
| Inventory | | | | | | |
| | New | Update | Delete | | | | | |

| Cycle #1 | | | | | | |
|---|---|---|---|---|---|---|
| TIME | EVENT | LOCATION | | # OF PEOPLE | | GROUP |
| | | FROM | TO | Program | Actual | (s) |
| Thursday, February 09, 2006 | | | | | | |
| | | | | | | |
| | | | | | | |
| | | | | | | |
| | | | | | | |

| | LDI Inc. | | | |
|---|---|---|---|---|
| ◇ Program Schedule | Program Record # 2759 | | Location (from Location) | |
| | Show in Client Schedule ☐ | | Name ☐ | ▽ |
| | Status: ○ Approved ○ Pending | | Sub locat. | ▽ |
| | Event | | Details | △▽ |
| Category | | ▽ | | |
| Name | | ▽ | to Location | |
| Details | | △▽ | Name ☐ | ▽ |
| | | | Sub locat. | ▽ |
| Cycle | | ▽ | Details | △▽ |
| | Start | End | | |
| Date | | ▽ | General Notes | |
| Timer | Start ▽ : ▽ ▽ | | | △▽ |
| | End ▽ : ▽ ▽ | | | |
| | Guests/Groups | | | |
| No. of Guests | by Groups Act. # | | | |
| Get Guests | Add Guest Total | | Record Created | |
| Groups | Guest's Groups Involved | | Date | |
| | | | Manager | |
| | | | Record Modified | |
| | | | Date | |
| | | | Manager | |
| | Remove Group | | # of Modif. | |
| | History | SEO | | Cancel Submit |

FIG. 9c

| Reports | Orders | Hospitality Packages | Accommodations Packages | Ticket Packages | Individual Tickets | Exchange Rates |

Manage Orders >
Manage Requests >

Enter in your search criteria:

Search by Customer Name
Search by Customer Email Address
Search by Order Date Ranger
Search by Order Total Amount
Search by Package Name
Search by Status  ○ Including Canceled  ○ Excluding Canceled Submit

FIG. 10b

| Reports | Orders | Hospitality Packages | Accommodations Packages | Ticket Packages | Individual Tickets | Exchange Rates |
|---|---|---|---|---|---|---|
| | | | | | | |
| | | | | | | |
| | | | | | | |
| | | | | | | |

FIG. 10c

| Reports | Orders | Hospitality Packages | Accommodations Packages | Ticket Packages | Individual Tickets | Exchange Rates |

Order # 13347      Order Date: 7/20/2005 8:06:14 PM   View mode

Bill To:    Account Holder:    Tickets User:

USA

☐ Shipping Included                                            Insert new Event/Ticket

| Package/Tickets | Type | Price | Quantity | | Total ($) | Disc. |
|---|---|---|---|---|---|---|
| | | | Requested | Confirmed | | |
| Individual Tickets | | | | | | |
| | | | | | | |
| | | | | | | |
| Subtotal - Individual Tickets | | | | | | |
| Total Amount | | | | | | |
| GRAND TOTAL | | | | | | |

Payment Option    ○ Option 1 discount    ○ Option 2 deposit    ○ Option 3 full payment Method of Payment    ○ VISA Credit Card (USA) Deposit    ○ VISA Credit Card (US$)

| Reports | Orders | Hospitality Packages | Accommodations Packages | Ticket Packages | Individual Tickets | Exchange Rates |

FR111A: Freestyle Skiing / Women's Medals - Qual. 2 finals (Qual - 15:00 - 16:30; Final - 19:00 - 20:00)

| Category | A |
|---|---|
| Status | ○ Active  ○ Not Active |
| Request Only | ○ Yes  ○ No |
| First Inventory | |
| Password from Plant Inventory | |

FIG. 10f

| TICKET MANAGER - Inventory | | | | | | |
|---|---|---|---|---|---|---|
| Individuals | Clients | On Hold | Complimentary | Brokers | Purchase | Inventory | Manager |

Events
Report
Sources
Sports
Venues

Archery
Athletics
Badminton
Baseball
Basketball
Beach Volleyball

BASEBALL

| | Start Time | End Time | Code | Type | Session Description | Venue |
|---|---|---|---|---|---|---|
| | | | | | | |
| | | | | | | |
| | | | | | | |
| | | | | | | |

FIG. 11a

| | TICKET MANAGER Individual Sales | |
|---|---|---|
| Individuals \| Clients | On Hold \| Complimentary \| Brokers \| Purchase \| Inventory \| Manager | |
| Client/Packages<br>Events<br>Orders | 3720 WEB Order Lock: D | |
| ...51 52 53 54 55 | Print this Allocation \| Print this Allocation w/o Price \| Print this Allocation - Total Value<br>Receipt (Guests) \| Print Invoice \| Print Pro Forma Invoice<br>Add new Event \| View Invoice \| View WEB Invoice | |

| # | Order | Cust. |
|---|---|---|
| | | |
| | | |
| | | |
| | | |

Add new Allocation

| Group | Code | Cat. | Sport Event | Date | Start | F. Value | Sale Price | QTY | Alloc. | | |
|---|---|---|---|---|---|---|---|---|---|---|---|
| | | | | | | | | | | | |
| | | | | | | | | | | | |
| | | | | | | | | | | | |

Total Tickets:
Total Commision:
Total Sale Value:
VAT - 11% on:
GRAND TOTAL:

☐ Payment Data

FIG. 11c

| | TICKET MANAGER Individual Sales | |
|---|---|---|
| Individuals \| Clients \| On Hold \| Complimentary \| Brokers \| Purchase \| Inventory \| Manager |||

Clients/Packages
Events
Orders

BASKETBALL

BKO42

Archery
Athletics
Badminton
Baseball
Basketball
Beach Volleyball

| Date | Start Time | End Time | Type |
|---|---|---|---|
| | | | |

Session Description

Venue

Athens Olympic Sports Complex (OAKA)

Olympic Indoor Hall

Available Tickets by Category

| Category | Price |
|---|---|
| | |

Please show desired Qty of Tickets and Category

Quantity  Category  Add Record

Find Tickets

| | TICKET MANAGER Corporate/NOC Clients | | | | | | | | |
|---|---|---|---|---|---|---|---|---|---|
| Individuals | Clients | On Hold | Complimentary | Brokers | Purchase | Inventory | Manager ||||||||

Client List
Contracts/Orders
Events

...8 9 10 11 12

| # | Client |
|---|---|
| 17 | |
| 12 | |
| 6 | |
| 5 | |
| 1 | |

Add new Allocation

5  Company Lock: 0

Print this Allocation | Print this Allocation w/o Price | Print this Allocation - Total Value
| Export in Excel | Graphics-Preview
Print Invoice | Print Pro Forma Invoice
Add new Event | View Invoice

| Group | Code | Cat. | Sport Event | Date | Start | F. Value | Sale Price | QTY | Alloc. |
|---|---|---|---|---|---|---|---|---|---|
| | | | | | | | | | |
| | | | | | | | | | |
| | | | | | | | | | |
| | | | | | | | | | |

☐ Payment Data

FIG. 11f

PROGRAM MANAGER - TRANSPORTATION

Edit/Update Vehicle Master Record (Vehicle ID: 1)

Home
Inventory
Clients
Programs
Transfers
Manager-Home

- Owner-Operator:
- Source:
- Vehicle Code:     LID:
- Make:     Model:
- Vin:     Year:
- NO. of seats:     Describe:
- Outside Dimension (LxWxH):     Mileage:
- Registration:     City of Registration:
- Air Conditioning:     Self Controlled at Each Seat:
- Toilet:     Location:
- CD/Radio:     Volume Controlled at Each Seat:
- PA System:     No. of Microphones:
- TV Monitors:     Number, Size and Position:
- VCR/DVD:     System (Euro, US, Multi-system):
- GPS:     Transmittable to TV Monitors:
- Call Buttons:     Location:
- Reclining Seats:     Describe:
- Fold-out Tables:     Describe:
- Seatbelts:     Location:
- Tinted Windows:     Describe:
- In-dash Cooler:     Capacity:
- Telephone/Radio:     Describe:
- Exterior Color:     Describe:

TRANSPORTATION - SCHEDULE

Date of last revision: 11/15/2004 9:41 PM
Revised by: Stephen

| | |
|---|---|
| Date | |
| Time | |
| Event | |
| Desc. | |
| Rec. # | |
| From Location | |
| From Sublocation | |
| Detail | |
| To Location | |
| to Sublocation | |
| Detail | |

| | |
|---|---|
| Group(s) | |
| No. of Guests | |
| Act. No. of Guests | |
| Cost Price () | |

| Transfer Type | Vehicle ID | Vehicle Code | Group(s) | # of People | |
|---|---|---|---|---|---|
| | | | | | |
| | | | | | |

Submit

Sidebar: Home, Inventory, Clients, Programs, Transfers, Manager-Home

FIG. 12f

PROGRAM MANAGER - TRANSPORTATION

Home
Inventory
Clients
Programs
Transfers
Manager-Home

ADDITIONAL TRANSFER REQUEST FORM - Edit Preview:

| Field | |
|---|---|
| Client/Program: | |
| Transfer Type: | |
| Description: | |
| From Location: | |
| Detail: | |
| To Location: | |
| Detail: | |
| Client/Group Information: | |
| Contact/Manager Name: | |
| Contact/Manager Phone: | |
| Contact/Manager Phone: | |
| Date Transfer: | use format mm/dd/yy |
| Time to pick-up: | : |
| Passenger: | |
| Total Passengers: | |
| Time of Arrival/Departure: | : |
| Flight Information: | |
| Vehicle Type requested: | |

——— Vehicle Assignment ———

| Field | |
|---|---|
| Transfer No: | |
| Vehicle Type Assigned: | |
| Vehicle Code Assigned: | |
| Driver Assigned: | |
| Driver Contact Number: | |
| Driver Instruction: | |

FIG. 12h

ATHENS 2004
Driver Dispatch Form

Transfer #                              Transfer Date:
Vehicle Assigned                        Time Pick Up:
Vehicle Code Client/Program:
From Location:
To Location:
Detail:

Passenger Name:
Total Passengers:
Flight Info:

Client Group Info:
Client Contact Name:
Client Contact Phone:

Date and Time Requested:
Transfer Event:
Description:
Vehicle Type Requested:

Driver Assigned:
Driver Contact Number:
Driver Instruction:

FIG. 12i

HOTEL/ROOMS DEFINITION

Home    Inventory    Clients    F & B    Manager-Home

New    New    New    New

New | Update | Delete    New    New    New

Total room(s): 34 | Add New Room

FIG. 13a

Edit/Update Hotel Room Record (Room ID:438)

- Room #:
- Deck/Floor:
- Connected:
- Connection:
- Adjacent-Previous:
- Adjacent-Next:
- Smoking:
- Room Type:
- Room View:
- Assigned Dining:
- Max. Guests:
- Bed Configuration:
- Add. Bed Configuration:
- Available from:
- Available to:
- Source:
- Cost Price - Curr. Sign:     Cost Price:
- Breakfast Included:     Additional Breakfast Price:
- Occupancy Included:     Additional Occupancy Price:
- Default Sale Price:
- Amenities
- Notes:

FIG. 13b

| ROOMS - CALENDAR - By Floor |
|---|
| Park Hotel Rinaldi Savigliano |

Home    Inventory    Clients    F & B    Manager-Home

New | Update | Delete    New    New    New    New    New

Total room(s): 15

Hotel Rooming List | Hotel Rooming List - Sched. | Hotel Summary - Room Type
Hotel Detail - Room Type | Hotel Summary - Clients Floor(s):

CALENDAR

FIG. 13c

ROOM - CALENDAR
Park Hotel Rinaldi Savigliano

Home    Inventory    Clients    F & B    Manager-Home

Edit/Update Hotel Room Calendar (Room ID:438) - Room #

Floor:              Room View:            Amenities:
Smoking:            Room Type:
Connected:          Connection:
Adjacent            Adjacent Next:
Previous:           Bed
New Guests:         Configuration:
Add Bed Config:     Assigned Dining:
Source:
Currency:           Cost Price:

FIG. 13d

| ROOM - CALENDAR |
| Due Mondi Hotel |

Home    Inventory    Clients    F & B    Manager-Home

Create Room Block

Client: 
Check-in Date: 
Check-out Date: 
Ship/Hotel:

Cycle/Package Codes: 
Contract Status: 
Contract: 
Room/Night Price:

Refresh

Selected Rooms:

Submit

Available Rooms

CALENDAR

FIG. 13e

HOTEL ROOMS BY CLIENT

Home     Inventory     Clients     F & B     Manager-Home

New | Update | Delete

Add New Room Block for this Client
Print Client Rooming List

Hotel - Le Meridien Lingotto

Deck / Floor #

CALENDAR

TOTALS

FIG. 13f

| | F & B - SCHEDULE | | | | |
|---|---|---|---|---|---|
| | Clients | LDI Inc. | | | |
| | Jet Set Individual Guests | | | | |
| Home | | | | | |
| Menus | | | | | |
| Wine & Beverages | LDI Inc. | | | | |
| Programs | | | | | |
| Rooms | | | | | |
| Manager-Home | | | | | |
| | New \| Update \| Delete | | | | |

| Cycle #1 | | | | | |
|---|---|---|---|---|---|
| TIME | EVENT | LOCATION | # OF PEOPLE | | GROUP (s) |
| | | | Program | Actual | |
| Thursday, February 09, 2006 | | | | | |
| | | | | | |
| | | | | | |
| | | | | | |
| | | | | | |
| | | | | | |
| Friday, February 10, 2006 | | | | | |
| | | | | | |
| | | | | | |
| | | | | | |
| | | | | | |

LDI Inc.

JET SET SPORTS – BANQUET EVENT ORDER

Food & Beverages

Menu | Wines & Beverages | Décor/Room Setup/entertainment/Billing/Notes | Print BEO

| Date | | Location | |
|---|---|---|---|
| Time | | Room | |
| Event | | No. of Guests | |
| Desc. | | Group(s) | |
| Rec. # | | Jet Set Contact Person | |
| Menu: | | Name | |
| | | Phone | |
| Billing Instructions | | Wines | |

| White Wine(s) | QTY | Price |
|---|---|---|

| Red Wine(s) | QTY | Price |
|---|---|---|

| Sparkling Wine(s) | QTY | Price |
|---|---|---|

Additional Beverages on Consumption

Décor

LINENS:

NAPKINS:

FLOWERS:

THEMING:

BUFFET SKIRTING:

Table Configuration and Setup

Additional Comments

FIG. 14d

|  | EMPLOYEES - LIST |
|---|---|
| | Mr. John Doe              Countdown to Torino 2006: -164 Days |
| Inventory<br>Manager-Home | Torino 2006 Olympic Games<br>Employee Registration<br><br>Back to Employees List<br><br>☐ EMPLOYEE INFORMATION      ☐ PREFERENCES AND OTHER INFORMATION<br>☐ ARRIVAL AND DEPARTURE INFORMATION    ☐ CONFIDENTIAL INFORMATION<br>☐ Upload RESUME    ☐ Upload RESUME (Doe_John_CV.doc)<br>☐ Upload COVER LETTER    ☐ Upload COVER LETTER (Doe_John_Cover_Letter.doc)<br>☐ Upload PHOTO    ☐ Upload PHOTO (DoeJohn.JPG)<br><br>Print Employee Form (s)<br><br>Add new Accompanying Guest |

| Accompany Guest | Relation | Arrival Date | Departure Date |
|---|---|---|---|
| | | | |

FIG. 15a

EMPLOYMENT MANAGEMENT SYSTEM

Logout | Manager, All

| Applications | Interviews | Application Status |

1065 -

Resend Confirmation

| Application Notes | |
|---|---|
| Fluency Assessment | ▼    Application Status ▼ |

SECTION I - Identification Information:

| Last Name | Middle Name Initial | First Name |
|---|---|---|
| | | |
| Preferred Name: (if different from the first name) | Gender: | Country of Citizenship |
| | ▼ | |

SECTION II - Contact Information

What is your current address?

| Street Address | | Apt/Suite/Floor | |
|---|---|---|---|
| City | | State | |
| Zip/Postal code | | Country | |

How can we contact you? (Please include area and/or county codes)

| Daytime Phone # | | Evening Phone # | |
|---|---|---|---|
| Mobile Phone # | | Fax # | |
| Email address | | | |

What is your permanent contact information for all tax related information. (i.e. where can we send information to you for up to one year following the Olympic Games?)

EMPLOYMENT MANAGEMENT SYSTEM

Logout   Manager, All

| Applications | Interviews | Application Status |

1065 -

Application Summary

Application Info

| Last Name | First Name | Middle Name | Application ID |
|---|---|---|---|
|  |  |  |  |

[Save Changes]

Interview Info

| Interview Date | Interview Time | Interview Location | Interviewer |
|---|---|---|---|
|  |  |  |  |

For Interviewer

| Appearance | ○ Very Presentable | ○ Somewhat Presentable | ○ Not Presentable |
|---|---|---|---|
| Arrival Time for Interview | ○ Early  ○ On Time  ○ Late  ○ No Show | | |
| Interests | ○ Outgoing  ○ Potential  ○ Average  ○ Boring | | |

| Login | Home Page | Profile | |
|---|---|---|---|

TORINO 2006 GUEST REGISTRATION

_____ has contracted Meetings & Incentives to arrange your air travel to the Olympic Games. All flights will be booked for departure from your home airport to Milan or Torino (based on flight availability) on Tuesday, February 21, 2006 to arrive on Wednesday, February 22, 2006 returning to the US on Monday, February 27, 2006. Any travel plans outside of the program dates or destinations will be at your own expense.

To make airline reservations for you and your guest please contact the following between 8:00 am CT and 5:00 pm CT.

Please check Arrival TBD and Departure TBD below. Once your air reservations are confirmed. Jet Set Sports will complete the arrival and departure information section of the guest registration for you.

All Non-airline questions regarding your Olympic Games experience with _____ should be directed to _____ Olympic Program Manager, Jet Set Sports at 908-765-1001.

| Arrival Information | Departure Information |
|---|---|
| Date of Arrival (mm/dd/yy) | Date of Arrival (mm/dd/yy) |
| Arrival Time (hh:mm AM/PM) | Departure Time (hh:mm AM/PM) |
| Approx. # of checked bags: | Approx. # of checked bags: |
| Arrival Airport/Station | Departure Airport/Station |
| [Turin International Airport ▼] | [Turin International Airport ▼] |

FIG. 17

| | | | | | # of people | | Group(s) |
| TIME | | EVENT | (From) LOCATION | To LOCATION | | | involved |
| From | To | | | | Program | Actual | |
|---|---|---|---|---|---|---|---|
| CYCLE: 0 | | | | | | | |
| Friday, February 10, 2006 | | | | | | | |
| 12:00 am 0:00 | 12:00 am 0:00 | | | | | 0 | |

Master Program Schedule

Torino 2006

LDI Inc.

FIG. 20b

Master Catering Schedule
LDI Inc.
Catering by Event Type
TORINO 2006

| TIME | | Event | Location | # of people | | Group(s) involved |
|---|---|---|---|---|---|---|
| From | To | | | Program | Actual | |
| CYCLE: 1 | | | | | | |
| Thursday, February 9, 2006 | | | | | | |
| 12:00 pm 12:00 | 2:00 pm 14:00 | Buffet Lunch | TBD Location | 30 | | Group # 1 |
| 5:00 pm 18:00 | 6:30 pm 18:30 | Reception | TBD Restaurant | 30 | | Group # 1 |
| 6:30 pm 18:30 | 7:00 pm 19:00 | Presentation | TBD Restaurant | 30 | | Group # 1 |
| 7:00 pm 19:00 | 9:00 pm 21:00 | Dine Around Dinner Welcome Dinner | TBD Restaurant | 30 | | Group # 1 |
| | | | Daily Total of Meals: | 120 | | |
| Friday, February 10, 2006 | | | | | | |
| 7:00 am 7:00 | 9:00 am 9:00 | Buffet Breakfast Buffet Breakfast #1 | TBD Hotel | 30 | | Group # 1 |
| 12:00 pm 12:00 | 2:00 pm 14:00 | Dine Around Lunch | TBD Restaurant | 30 | | Group # 1 |
| | | | Daily Total of Meals: | 60 | | |
| Friday, February 10, 2006 | | | | | | |
| 7:00 am 7:00 | 9:00 am 9:00 | Buffet Breakfast | TBD Hotel | 30 | | Group # 1 |
| 1:00 pm 13:00 | 3:00 pm 15:00 | Dine Around Lunch | TBD Restaurant | 30 | | Group # 1 |
| 10:45 pm 22:15 | 1:00 am 1:00 | Buffet Dinner Buffet Dinner #2 Past, Present & Future | TBD Hotel | 30 | | Group # 1 |
| | | | Daily Total of Meals: | 90 | | |

FIG. 21b

| TIME | | EVENT | MENU | LOCATION | Actual # of people | | Actual # of meals | Group(s) involved |
|---|---|---|---|---|---|---|---|---|
| From | To | | | | 1/2 day | full day | | |

Master Hospitality Schedule
LDI Inc.
TORINO 2006

CYCLE: 1

Thursday, February 9, 2006
- 12:00 pm / 1:00 am  Hospitality Open    TBD Hotel    Group #1
- 0:00 / 1:00

DAILY TOTAL    2/9/2006

Friday, February 10, 2006
- 6:00 am / 1:00 am  Hospitality Open    TBD Hotel    Group #1
- 6:00 / 1:00
- 4:30 pm / 6:00 pm  Hospitality Open    TBD Restaurant    Group #1
- 16:30 / 18:00

DAILY TOTAL    2/10/2006

Saturday, February 11, 2006
- 6:00 am / 1:00 am  Hospitality Open    TBD Hotel    Group #1
- 6:00 / 1:00

DAILY TOTAL    2/11/2006

Sunday, February 12, 2006
- 6:00 am / 1:00 am  Hospitality Open    TBD Hotel    Group #1
- 6:00 / 1:00

DAILY TOTAL    2/12/2006

Monday, February 13, 2006
- 6:00 am / 12:00 pm  Hospitality Open    TBD Hotel    Group #1
- 6:00 / 12:00

DAILY TOTAL    2/13/2006

TOTAL:

FIG. 21c

TORINO 2006 — GUEST REGISTRATION FORM

| *Client/Program | (*) Cycle(s) | (*) Package Code(s) | ☐ Primary Guest ☐ Staff/Management | |
|---|---|---|---|---|
| *Salutation | *First Name | Middle Init. | *Last Name | Informal Name |

| *Gender ☐ Female ☐ Male | *Citizenship | *Passport # | *Passport Exp. Date |
|---|---|---|---|

| *Correspondence should be mailed to ☐ Home ☐ Business | *Pre-Olympic: Contact Phone ☐ Home ☐ Business | *Olympic Period: Preferred contact at ☐ Mobile Phone ☐ Pager ☐ N/A |
|---|---|---|

CONTACT INFORMATION - HOME

| *Home Address (Street and Apt.#) | *City | *State/Province | *Post.Code |
|---|---|---|---|
| *Phone | Fax | *E-mail address | *Country |

CONTACT INFORMATION - BUSINESS

| (*) Company Name | (*) Job Title / Department | |
|---|---|---|
| (*) Business Address (Street and Suite #) | (*) City | (*) State/Province (*) Post.Code |
| (*) Phone | Fax | (*) Country |
| Contact Person Name | Contact Person Title | |
| Contact Person Phone | Contact Person Fax | Contact Person E-mail |

CONTACT INFORMATION IN CASE OF AN EMERGENCY

| * Name | * Relation | |
|---|---|---|
| *Address | *Phone - Daytime | Phone - Nighttime |
| Mobile Phone | Pager | E-mail |

ARRIVAL INFORMATION | DEPARTURE INFORMATION

| *Date of Arrival | *Arrival Time | # of bags | *Date of Departure | *Departure Time | # of bags |
|---|---|---|---|---|---|
| *Please select type of Transportation | | | *Please select type of Transportation | | |
| ☐ Commercial Air Transportation | | | ☐ Commercial Air Transportation | | |
| (*) Airline | (*) Flight # | (*) Arrives from | (*) Airline | (*) Flight # | (*) Destination |
| ☐ Private Air Transportation | | | ☐ Private Air Transportation | | |
| (*) Tail # | (*) Aircraft Type | | (*) Tail # | (*) Aircraft Type | |
| (*) Ground Handling Company | (*) Arrival Airport | | (*) Ground Handling Company | (*) Departure Airport | |
| ☐ Other Transportation | | | ☐ Other Transportation | | |
| Note/Comments | | | Note/Comments | | |

PREFERENCES AND OTHER INFORMATION

FIG. 22b

| | | | | GUEST REGISTRATION FORM |
|---|---|---|---|---|
| TORINO 2006 | | | | |
| | Primary Guest Information | | | Accompanying Guest |
| First Name | Last Name | Status ☐ Primary Guest ☐ Staff/Management | | |

| Salutation | First Name | Middle Init. | Last Name | Informal Name |
|---|---|---|---|---|
| Gender ☐ Female ☐ Male | | Citizenship | Passport # | Passport Exp. Date |
| Relation to the Primary Guest | | | | |

CONTACT INFORMATION IN CASE OF AN EMERGENCY
☐ Same as the Primary Guest, or

| (*) Name | | (*) Relation | |
|---|---|---|---|
| (*)Address | | (*)Phone - Daytime | Phone - Nighttime |
| Cell Phone | Pager | E-mail Address | |

| ARRIVAL INFORMATION<br>☐ Same as the Primary Guest, or | | | DEPARTURE INFORMATION<br>☐ Same as the Primary Guest, or | | |
|---|---|---|---|---|---|
| Date of Arrival | Arrival Time | # of bags | Date of Departure | Arrival Departure | # of bags |
| Please select type of Transportation<br>☐ Commercial Air Transportation | | | Please select type of Transportation:<br>☐ Commercial Air Transportation | | |
| Airline | Flight # | Arrives from | Airline | Flight # | Destination |
| ☐ Private Air Transportation | | | ☐ Private Air Transportation | | |
| Tail # | Aircraft Type | | Tail # | | Aircraft Type |
| Ground Handling Company | Arrival Airport | | Ground Handling Company | | Departure Airport |
| ☐ Other Transportation | | | ☐ Other Transportation | | |
| Note/Comments | | | Note/Comments | | |

PREFERENCES AND OTHER INFORMATION

| Do you have any health conditions that we should know about (Special medications, allergies, difficulty in walking, wheelchairs, etc.) ? |
|---|
| Dietary restrictions (diabetic, vegetarian, ...) ? |
| Language Spoken (if English is not primary language) ? |
| Other notes, comments or concerns? |

FIG. 22c

| Program Information | | PIN | Email address (login ID) | ARRIVAL | | DEPARTURE | |
|---|---|---|---|---|---|---|---|
| Cycle(s)/Package(s) | Primary / Accomp. Guest Name | | | Same | Date and Time | Same | Date and Time |
| PRIMARY GUEST STATUS : Guest | | | | | | | |
| 1 | Mr. John Doe | 103839 | john@cosport.com | | | | |
| | Mrs. Jane Doe (wife) | | | Yes | | Yes | |
| 2 | Mr. John Doe | 112828 | jdoe@gmail.com | | 2/5/2006 8:03:00PM | | 2/9/2006 6:00PM |
| | MRS Jane Doe (wife) | | | | 2/4/2006 8:02:00PM | | 2/18/2006 5:00PM |
| 3 full | Mr. John Doe | 103036 | john@jetsetsports.com | | 2/5/2006 3:04:00PM | | |
| | Mr. j d | | | | | | |
| Total # of registered Guests : | 6 | | | | | | |
| PRIMARY GUEST STATUS : Staff / Management | | | | | | | |
| 4 CYCLE 1 | Mr. Joe Black | 113005 | joe@jetsetsports.com | | | | |
| | Mrs. Jane Black (Mom) | | | | | | |
| Total # of registered Guests : | 2 | | | | | | |
| Client Total # of registered Guests : | 8 | | | | | | |

GUEST REGISTRATION - GUEST LIST

TORINO 2006

LDI Inc.

FIG. 22d

| Login | Home Page | Profile |

LDI Inc.

◇ Transportation (Preview Mode)

A complete Transportation Schedule for LDI Inc. Olympic Hospitality Program is now in view.

Cycle #1

| TIME | EVENT | LOCATION | | # OF PEOPLE | | GROUP(s) | Cost Curr. | Price Price | Transportation/ Vehicles |
|---|---|---|---|---|---|---|---|---|---|
| | | From | To | Contract | Actual | | | | |
| Thursday, February 09, 2006 | | | | | | | | | |
| 07:00 AM 01:00 PM | Transfer to Hotel | Airport Caselle | TBD Hotel | 30 | | Group #1 | | 0.00 | |
| 05:30 PM 06:00 PM | Transfer to Restaurant | TBD Hotel | AB+ | 30 | | Group #1 | | 0.00 | |
| 09:00 PM 09:30 PM | Transfer to Hotel | AB+ | TBD Hotel | 30 | | Group #1 | | 0.00 | |
| Friday, February 10, 2006 | | | | | | | | | |
| 11:30 AM 12:00 PM | Transfer to Restaurant | TBD Hotel | TBD Restaurant | 30 | | Group #1 | | 0.00 | |
| 02:00 PM 02:30 PM | Transfer to Hotel | TBD Restaurant | | 30 | | Group #1 | | 0.00 | |
| 04:00 PM 04:30 PM | Transfer to Hospitality | AB+ | Palasport Olimpico | 30 | | Group #1 | | 0.00 | |

FIG. 23b

|  | Login | Home Page | Profile |  |
|---|---|---|---|---|

TORINO GUIDE

General Information

The Olympic Winter Games

Competition Schedule

Venue Information

In order to make your guest's experience at the 2006 Olympic Winter Games as exciting and comfortable as possible, we have put together information that we hope you find useful in preparing for their trip to Torino. If there is some information in particular that you are looking for and do not find it below, please let us know and we will do our best to find you that information.

FIG. 24

METHOD FOR OLYMPIC EVENT HOSPITALITY PROGRAM MANAGEMENT

CROSS-REFERENCE TO RELATED APPLICATIONS

This application claims the benefit of U.S. Provisional Application entitled "Method for Olympic Event Hospitality Program Management System", Ser. No. 60/707,146, filed Aug. 11, 2005.

FIELD OF INVENTION

The invention relates to a method for the creation and management of hospitality programs for Olympic (and other) events, including pre-event planning, onsite logistics and management and post event activities.

BACKGROUND

The Olympic events are one of the most internationally renowned sporting events. Many people travel great distances to attend these events. Many corporations and other groups plan corporate or group activities involving employees and/or guests. A number of entities provide support for these activities. One example of such a provider is a hospitality program provider. Hospitality program providers for Olympic events may offer one of many services including obtaining tickets, accommodations, local transportation, local food and beverage services, local staff, coordinating gift and collateral for the groups and various other services. The amount of planning and logistics involved in handling some of these hospitality programs can be very significant. In the past, many of these activities were performed manually. This is tedious, time consuming and inefficient. More recently, some aspects of these logistics and management have been automated through the use of computer technology. However, the existing systems have many shortcomings.

In addition to the pre-event planning there is a significant amount of on-site logistics management and communication that may be necessary. Prior systems have a limited capability with respect to these on-site activities. One drawback is the inability to effectively and timely communicate changes that may occur at the last minute.

Additionally, many prior approaches fail to take into account the significant opportunities that may exist for post-event activities including remarketing other events to corporations and/or guests. These and other drawbacks exist.

SUMMARY

One aspect of the invention relates to a method for effectively managing all (or selected) aspects of a hospitality program for an Olympic event including pre-event planning, on-site execution, and post event activities. Employees (or other representatives) of a hospitality program provider (including for example, program directors, program managers, hosts/hostesses, drivers, caterers, etc.) may arrange aspects of the hospitality for an event or multiple events. An inventory of Olympic event hospitality related items may be acquired for the creation of hospitality programs for one or more corporations or other groups (for convenience often referred to as "groups"). The group may include one or more group coordinator, one or more primary guests of the group and/or one or more additional guests of the primary guest. One or more individuals who may desire to purchase a hospitality package may also access the services of the hospitality program provider. Inventory may be supplied by one or more partners of the hospitality program provider (for example, sales agents, local partners, accommodations providers, transportation providers and other partners), employees and/or applicants for staffing the hospitality programs and/other participants.

Different participants implement different methods at different times (for example, pre-event, onsite and post-event). The pre-event activities may be separated into at least three parts: initial event set-up, third party coordination, and client program set-up and management. The initial event set-up includes various aspects of identifying an event (e.g., an Olympic event), obtaining information and inventory of event related items (e.g., ticket information, accommodations, restaurants and other hospitality venues, potential local service providers etc.), and entering the information and inventory into the system. Other initial event set-up steps may be performed to assist with information needed to plan hospitality program for a large number of groups. After an event is set up by the hospitality program provider, the hospitality program provider may coordinate and/or contract with third party participants (e.g. local service providers) to provide resources for the hospitality programs to be provided. Another part of the pre-event planning includes creating and managing client programs. After an event and inventory for the event have been created and entered into the system, client programs may be created for one or more client groups (corporations or other groups).

The hospitality program provider may assign a program manager (or other representative) to each group and/or one or more program directors to oversee inventory items. According to the hospitality parameters provided by the group coordinator, the program directors may begin to customize the group's hospitality program by allocating to the group hospitality items (food, beverages, accommodations, entertainment venues, event tickets, transportation and/or other hospitality items) from the existing inventory and/or obtaining additional inventory. Additionally, the invitees or guests of the group may supply additional pieces of information by registering through the system and/or providing additional information/preferences. Group coordinators, invitees, program directors and program managers may define all (or most) parts of a hospitality program including program schedule, program timeline and specific allocation of hospitality items (e.g. accommodations, tickets, transportation, schedules). Registration may include at least two parts including initial registration information and event specific information. Initial registration information may include general guest information such as name, address, citizenship, contact information (e.g., mobile phone number, pager, email, fax), languages spoken, emergency contact, passport number and/or other information. Initial (or updated) registration information may be used again for future events. The registrant may also provide event specific information such as arrival/departure times, accommodation preferences, dining preferences, event preferences, among other things.

On-site event management may include the timed execution and staffing of each scheduled item in the program schedule. From the group(s)' arrival to the group(s)' departure, aspects of the hospitality program (including resources and staff) may be scheduled according to the program schedule. In order to enable effective and timely communication staff and guests may be provided a mobile communications device may be provided to each guest of the group.

The post-event activities may include one or more of marketing future events to corporate groups or guests, advertising event related merchandise, sending thank you messages, finalizing account balances, addressing complaints made during the event, and surveying corporate groups to evaluate the hospitality program. Clients, including corporate groups and individual guests, makeup a target audience for receiving follow up information with respect to goods, services, and future events that may be of interest to the group based on stored corporate profile, guest and individual guest information.

According to some embodiments, a computer implemented method for acquiring an inventory of event hospitality items is used to create hospitality programs for client groups. Each guest of the client group is provided with an on-line guest registration which tracks any changes to guest's profiles over the Internet. Any changes to the hospitality program may be tracked and may be communicated to program mangers and/or client's guests. Also, an on-line sales component allows individual guests to purchase hospitality items directly from the event related hospitality inventory.

The method may also include providing on-site information during the event to client groups, directors, and/or managers. One embodiment may include an electronic mobile device for providing on-site real-time updates with respect to the event and/or the hospitality arrangements. Alternative embodiments employ the use of cell phone, pager, PDA, or any other mobile device with network capabilities.

BRIEF DESCRIPTION ON DRAWINGS

These and other features, aspects and advantages of the present invention will become better understood with reference to the following description, appended claims, and accompanying drawings where:

FIG. 7 is a screen shot of a login to the management system, according to an embodiment of the invention.

Figure 9B:
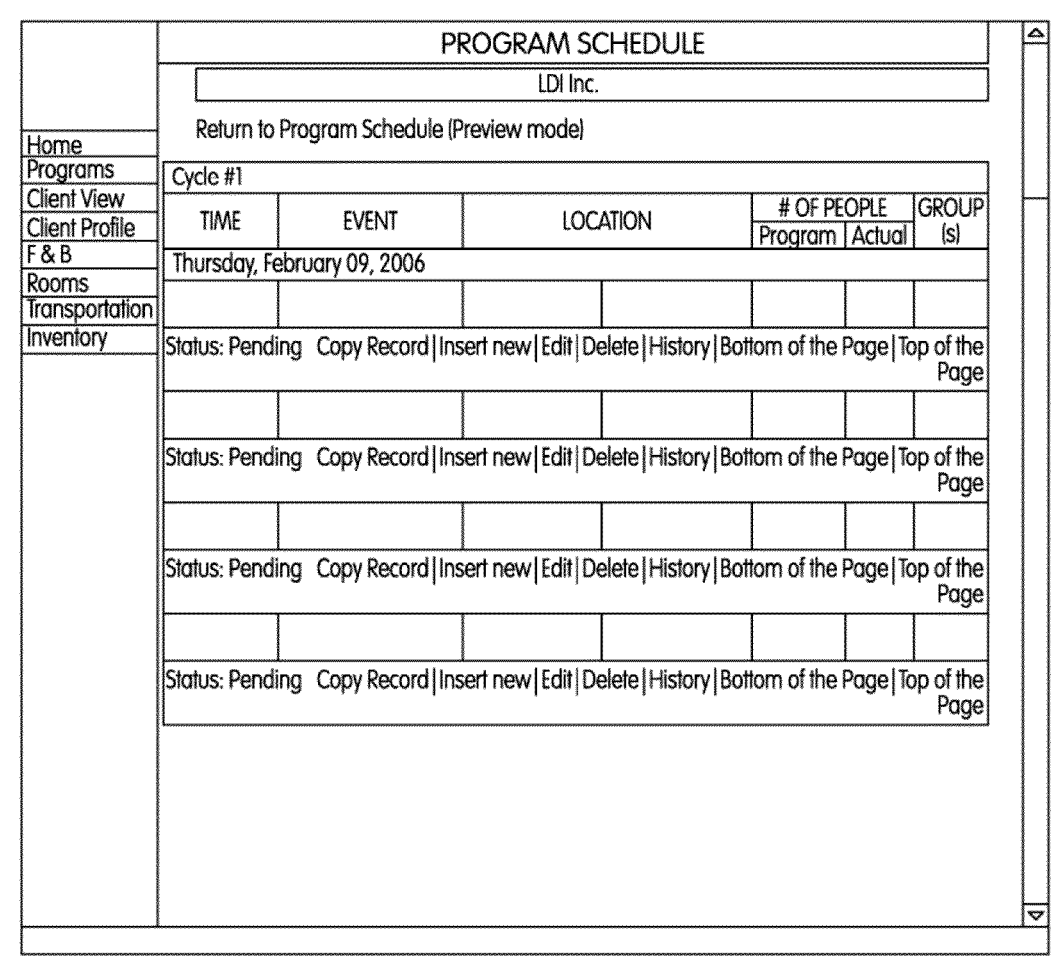

FIG. 9a-9d are screen shots of the program manager's views of program scheduling, according to an embodiment of the invention.

FIG. 10a-10f are screen shots of the program manager's views for the online sales, according to an embodiment of the invention.

FIG. 11a-11g are screen shots of the program manager's views for ticket inventory, according to an embodiment of the invention.

Figure 12D:
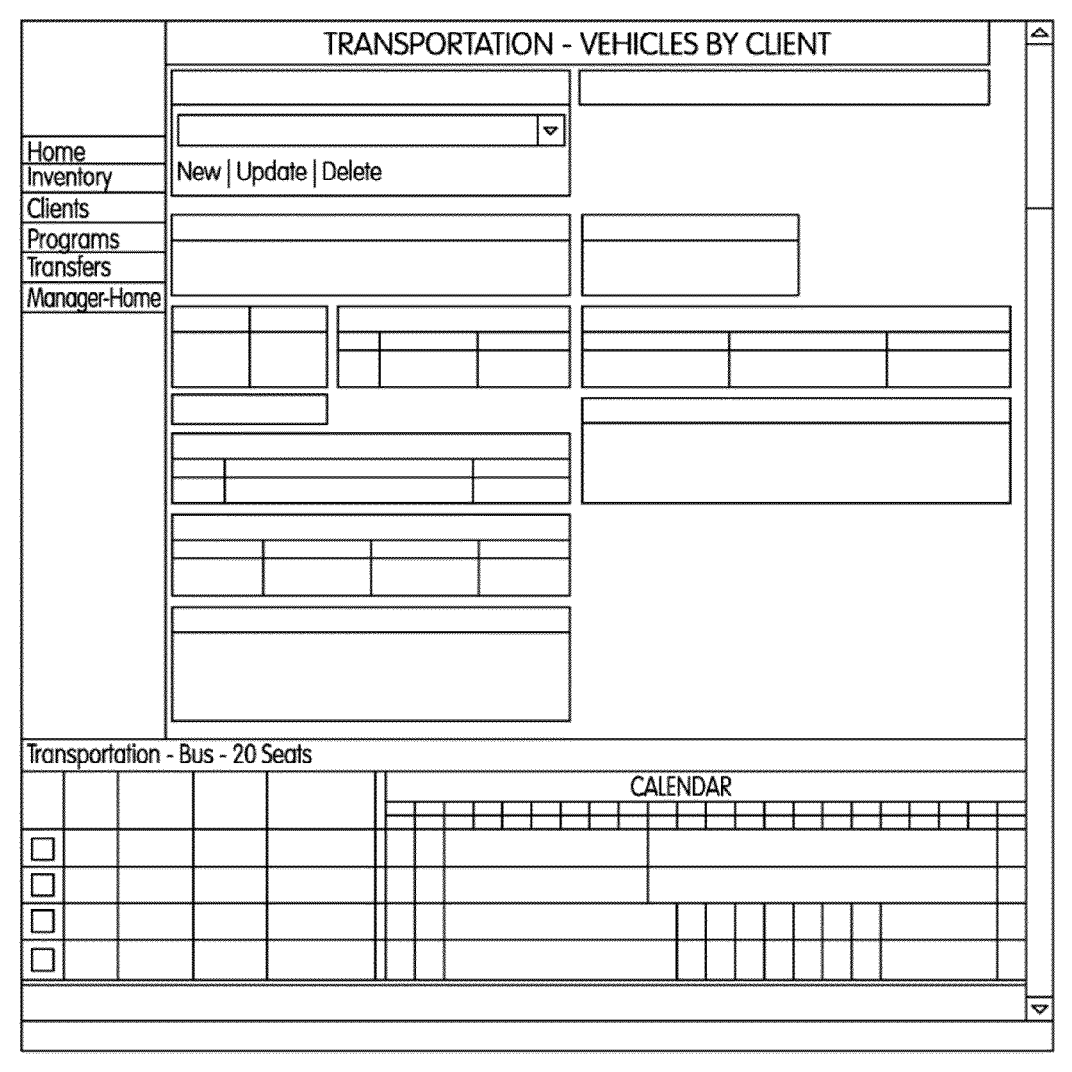
Figure 12E:
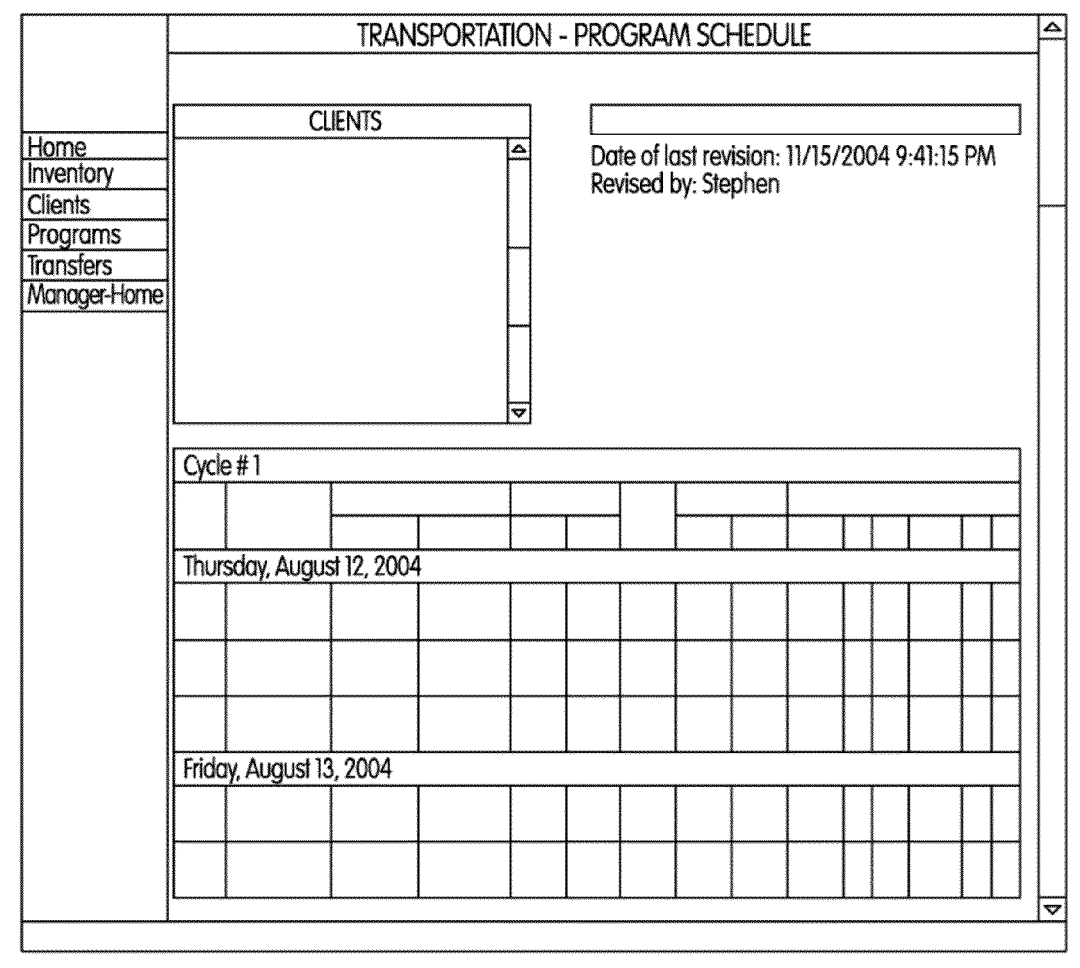

FIG. 12a-12i are screen shots of the program manager's views for transportation, according to an embodiment of the invention.

FIG. 13a-13f are screen shots of the program manager's views for accommodations, according to an embodiment of the invention.

Figure 14B:
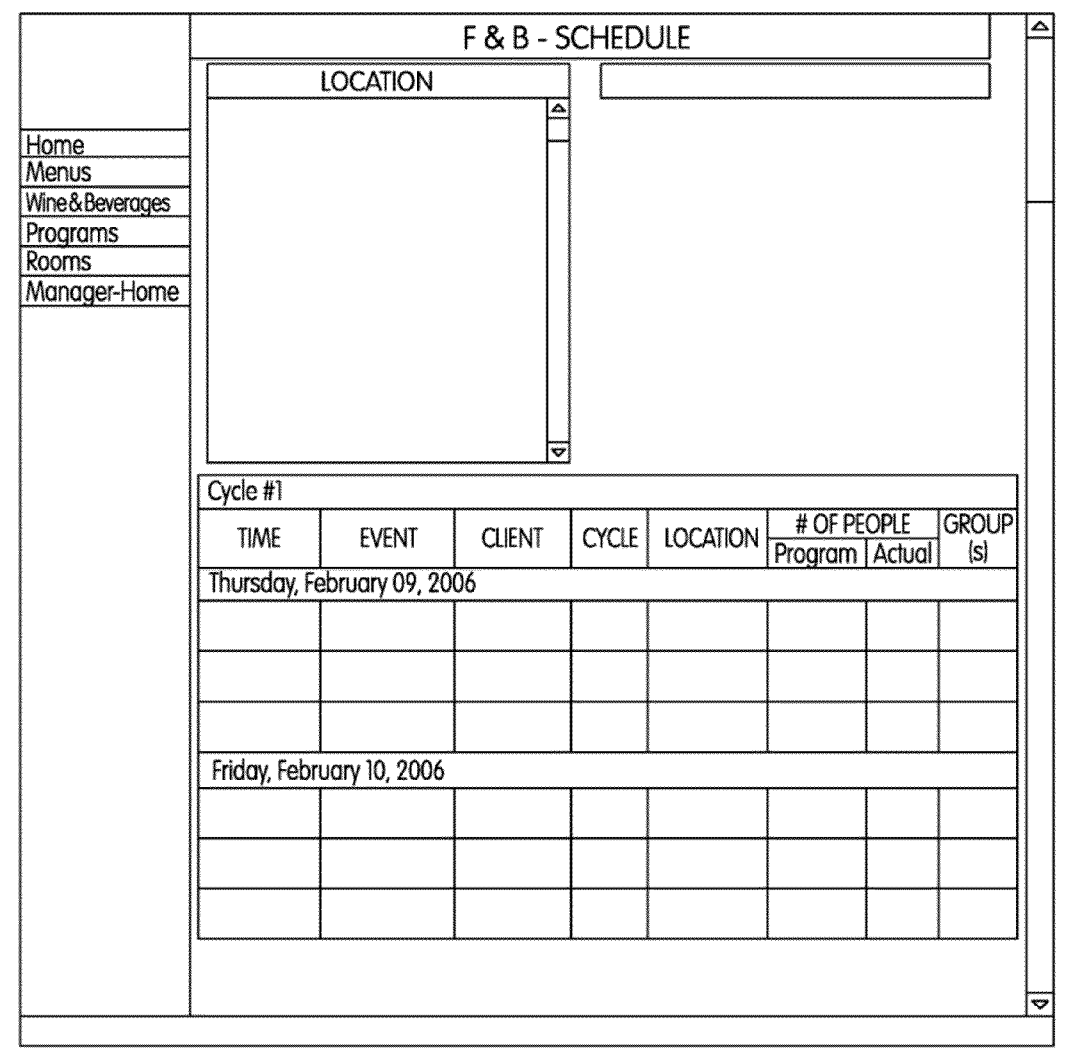

FIG. 14a-14d are screen shots of the program manager's views for food and beverages, according to an embodiment of the invention.

Figure 15D:
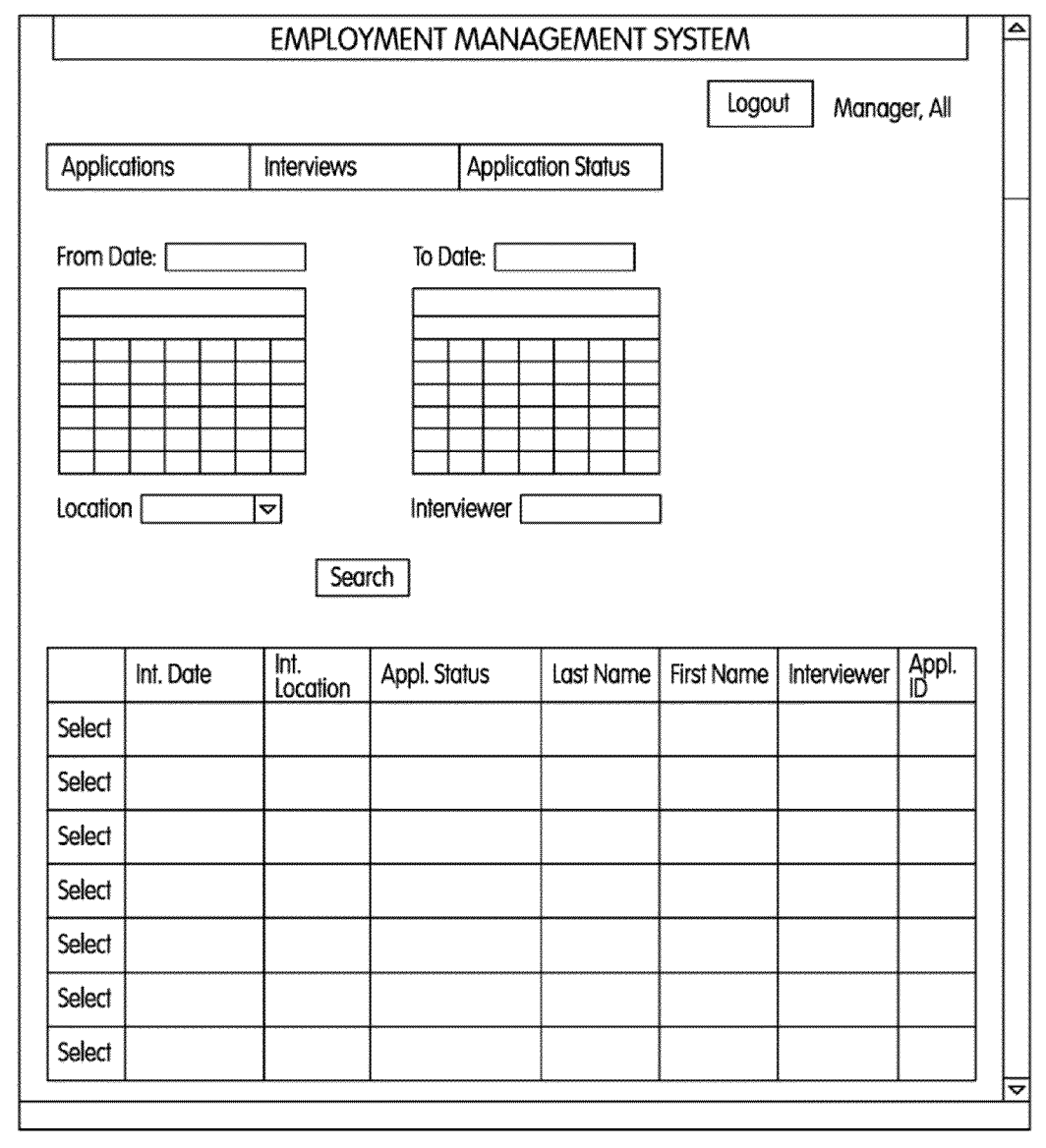
Figure 15F:
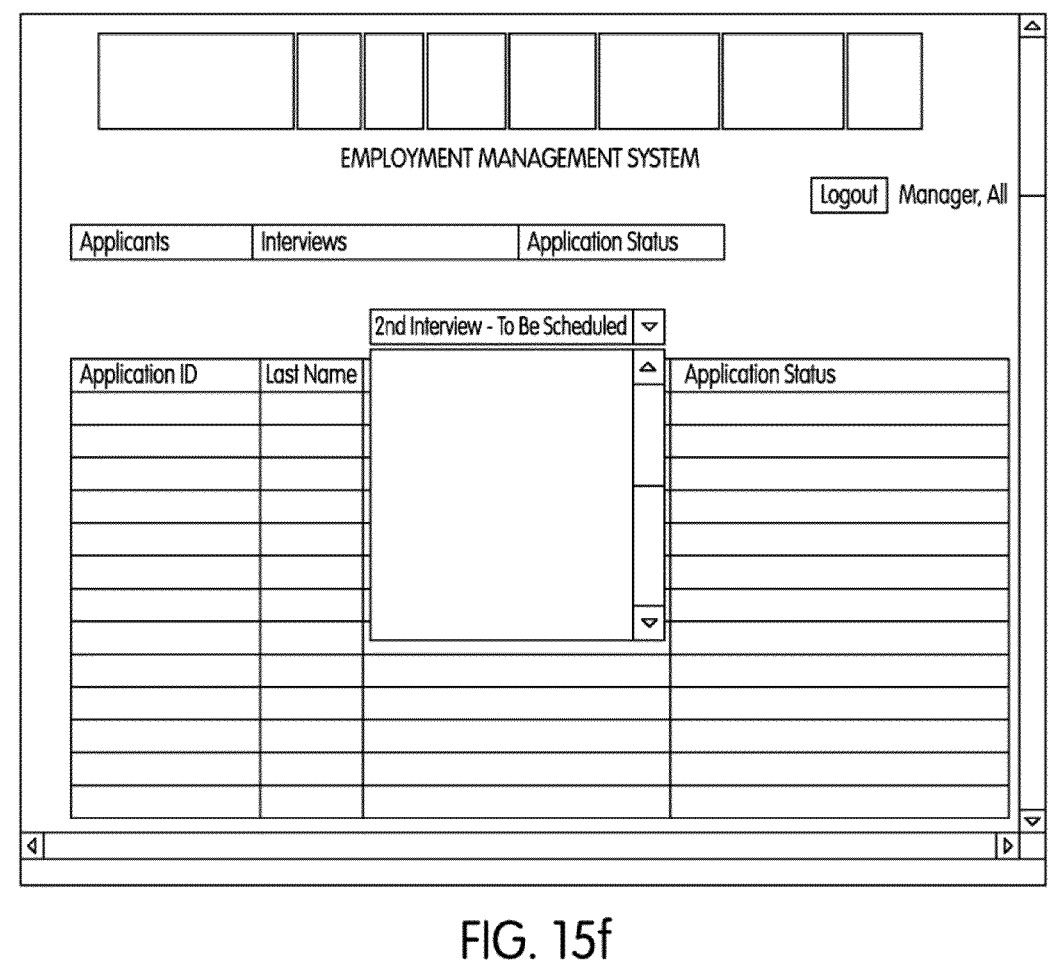

FIG. 15a-15f are screen shots of the program manager's views for employment, according to an embodiment of the invention.

FIG. 16 is a sample screen shot of the program manager home page, according to an embodiment of the invention.

FIG. 17 is a sample screen shot of a guest registration user interface, according to an embodiment of the invention.

FIG. 20a-20b are screen shots of the client program view for program schedule, according to an embodiment of the invention.

FIG. 21a-21c are screen shots of the client program view for food and beverage, according to an embodiment of the invention.

FIG. 22a-22d are screen shots of the client program view for guest registration, according to an embodiment of the invention.

FIG. 23a-23b are screen shots of the client program view for transportation, according to an embodiment of the invention.

FIG. 24 is a screen shot of the client program view for city guide, according to an embodiment of the invention.

DETAILED DESCRIPTION

The present invention is a method for providing management services to coordinate aspects of hospitality surrounding an Olympic (or other) event. Some functions of the management method include internal inventory management and reporting, and the management of multiple hospitality programs, for multiple groups (and for multiple events). These functions may be described in terms of pre-event planning, on-site execution and post event activities. Internal inventory management and reporting covers accommodations, transportation, ticketing, food and beverages, hospitality passes and staff.

Figure 1:
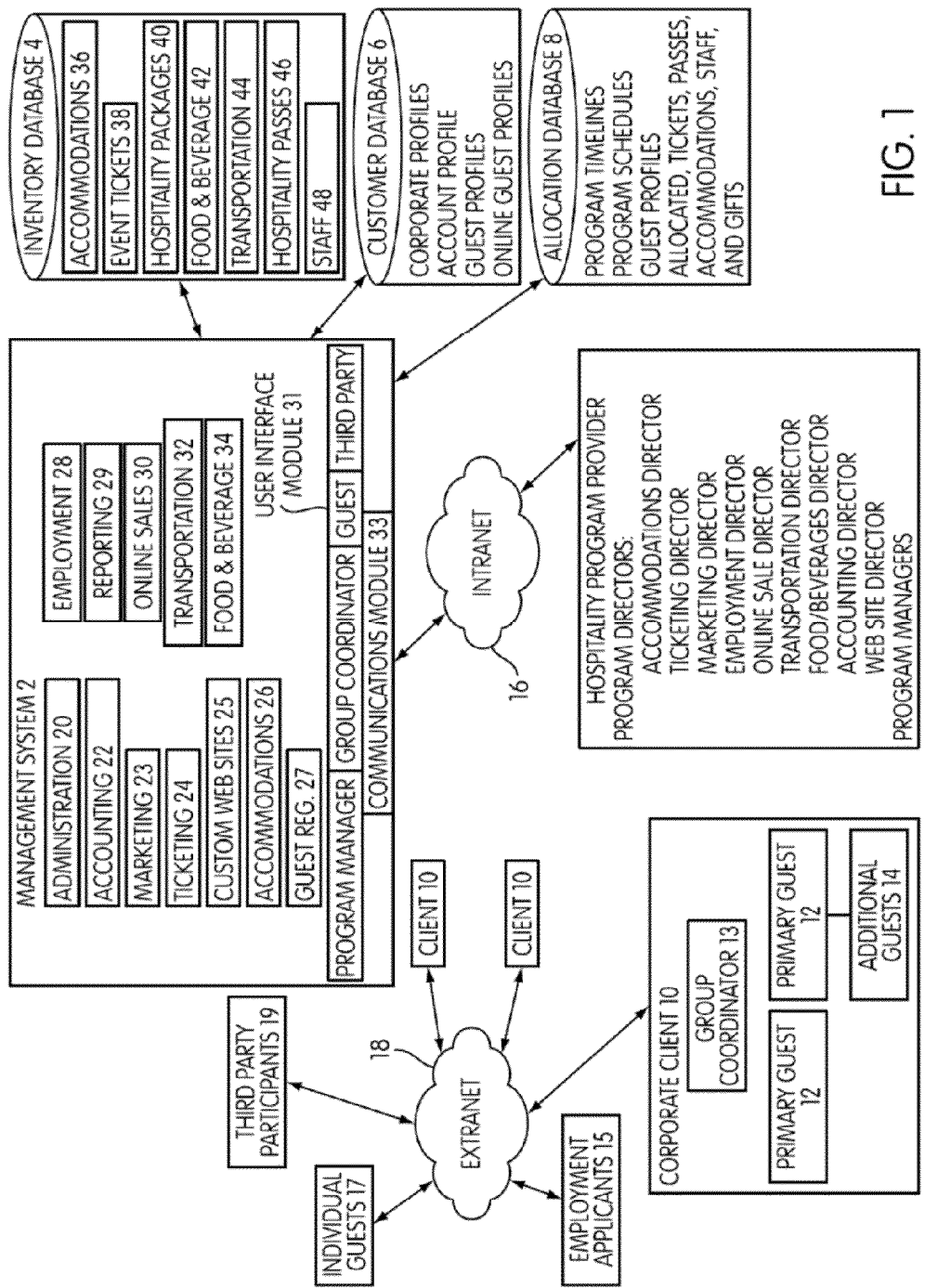
FIG. 1 is a block diagram of the management system 2 in connection with the networking environment, according to an embodiment of the invention.
Figure 2:
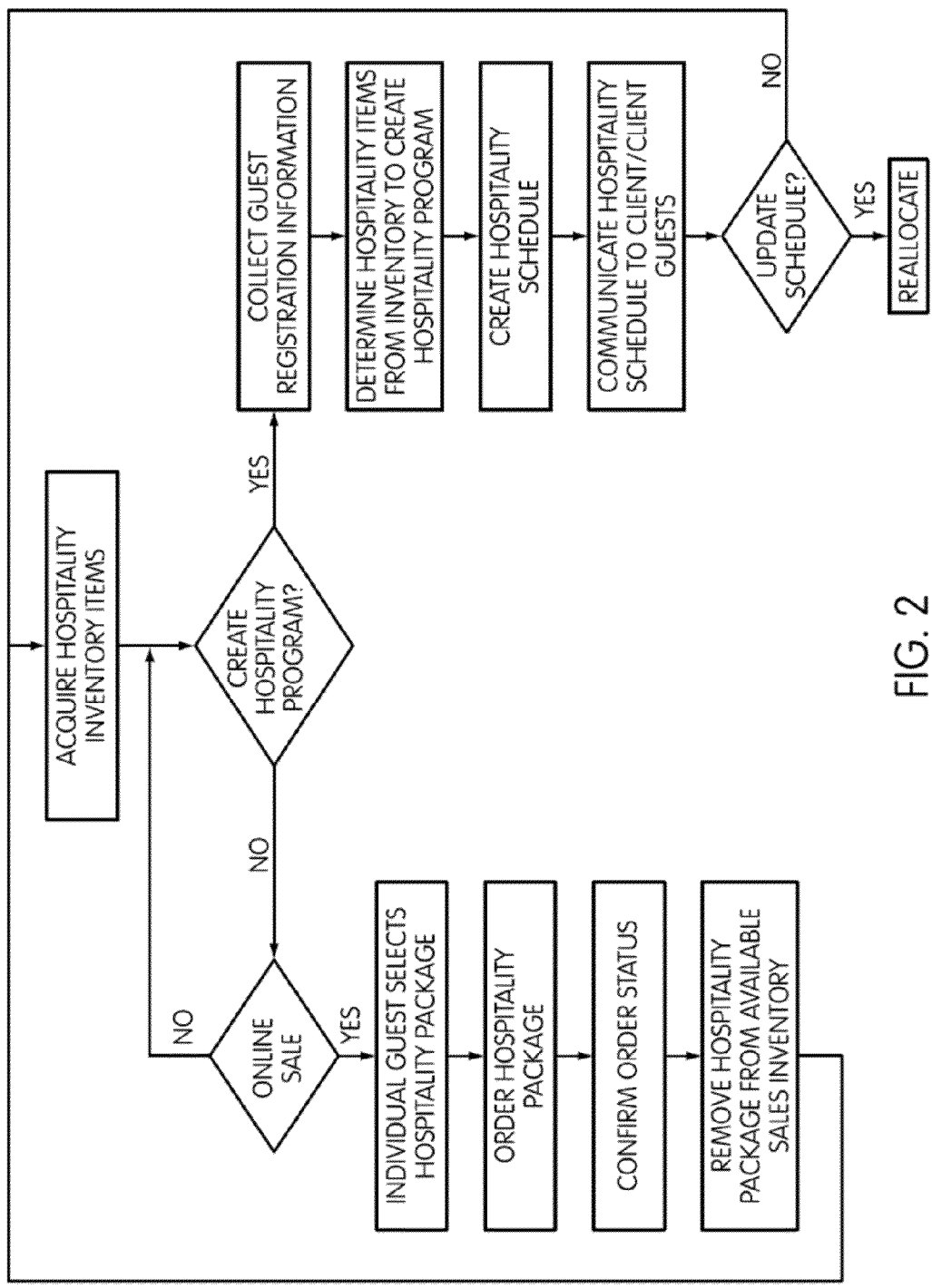
FIG. 2 is a flow chart for the method of online sales and group programs, according to an embodiment of the invention.

FIG. 1 refers to one example of an event management system 2 of the present invention. The system may be linked at least through a private network in the form or the Intranet 16 and a public network in the form of an Extranet 18. Intranet 16 provides a private and more secure access to the management system 2 which allows a internal participants (such as program directors and program managers) control over at least various management aspects shown in the event management system 2. Program directors may oversee the management and inventory within the inventory database 4. Program managers may manage each group. Those and other roles may be performed by one or more personnel. External participants include employment applicants 15, individual guests 17, third party participants 19, corporate clients 10, each of which may have a number of guests, including a plurality of primary guests 12, additional guests 14, one or more group coordinator 13, and other external participants. External participants access the system through the extranet including Internet.

Both internal and external participants may access the event management system 2 in various ways in order to conduct pre-event activities, on-site activities and post event activities. The pre-event activities may be separated into at least three parts: initial event set-up, third party coordination, and client program set-up and management. On-site activities may include the timed execution and staffing of each scheduled item in the program schedule. In some cases, internal participants may include the staff members such as program managers, program directors, host, hostesses, drivers, caterers, servers and/or tour guides, employed by the event management system. These internal participants can access the management system 2 for pre-event activities through the secure intranet. During on-site activities, internal participants located on-site may employ mobile devices connected through public network connections. The post-event activities may include one or more of marketing future events to corporate groups or guests, advertising event related merchandise, sending thank you messages, finalizing account balances, addressing complaints made during the event, and surveying corporate groups to evaluate the hospitality program.

In operation, different participants interact with the system in different ways and/or at different times (for example, pre-event, onsite and post-event). For example, various different internal participants may use the system in the following exemplary fashion. During pre-event activities, internal participants may identify the event for which hospitality will be provided and based on event information may begin to establish third-party participants such as local service providers from which hospitality items may be purchased. An internal inventory may be created according to the hospitality items supplied by these third party participants. The inventory may be used to create hospitality programs to interested individuals or corporate clients wanting to arrange hospitality for a group of primary guests or employees and their guests to the event. Contract terms may be established for each corporate client or other group in order to supply internal participants some guidance when creating a hospitality program. Scheduling each event and hospitality arrangements may be shared with corporate clients and their guest through a dedicated home page. The pre-event activity steps may be used to coordinate as many aspects of hospitality before the arrival of the guests at the event location.

Internal participants use the event management system for on-site activities of each scheduled item in the hospitality program schedule. On-site activities ensure aspects of the hospitality schedule may be carried out seamlessly, from meeting guests at the airport, escorting guests to and from events, and requesting additional arrangements as the need occurs. Post-event management allows internal participants the chance to plan future events for the corporate client and also follow up with information regarding other goods and services provided by event organizers and/or merchandisers.

Various different external participants may use the system in the following exemplary fashion. A corporate group is an external participant for which hospitality programs may be created and maintained. During pre-event activities, a group coordinator may be assigned to manage invitations to the event, set a corporate budget, coordinate allocation of hospitality items to guest and, access a web page dedicated to providing information regarding the hospitality program. Corporate groups may also be supplied on-site use of the management system via mobile devices accessing various aspects of the management system for supplying real-time alerts and notifications based on venue information, event information, and/or hospitality information. The corporate client may also submit requests to the management system during the event. Post-event access to the management system allows the corporate client to access account statements, fill out evaluations, view response to complaints, receive information regarding event related merchandise and information on future events of potential interest.

In addition to corporate clients, external participants also include individual guests, employment applicants, and third party participants. Individual guest access the event management system using an online sales web-site via Internet, which allows individual guests to purchase hospitality packages directly from inventory. Employment applicants may also use a web-site supplied by the event management system to apply for open staff positions. And third party participants include resellers and/or service providers (e.g. drivers, restaurants, hotels, etc.). Optionally, if a service provider inventory is implemented in a computer based system, the event management system may be linked directly with the service provider in order to obtain hospitality inventory.

Figure 3:
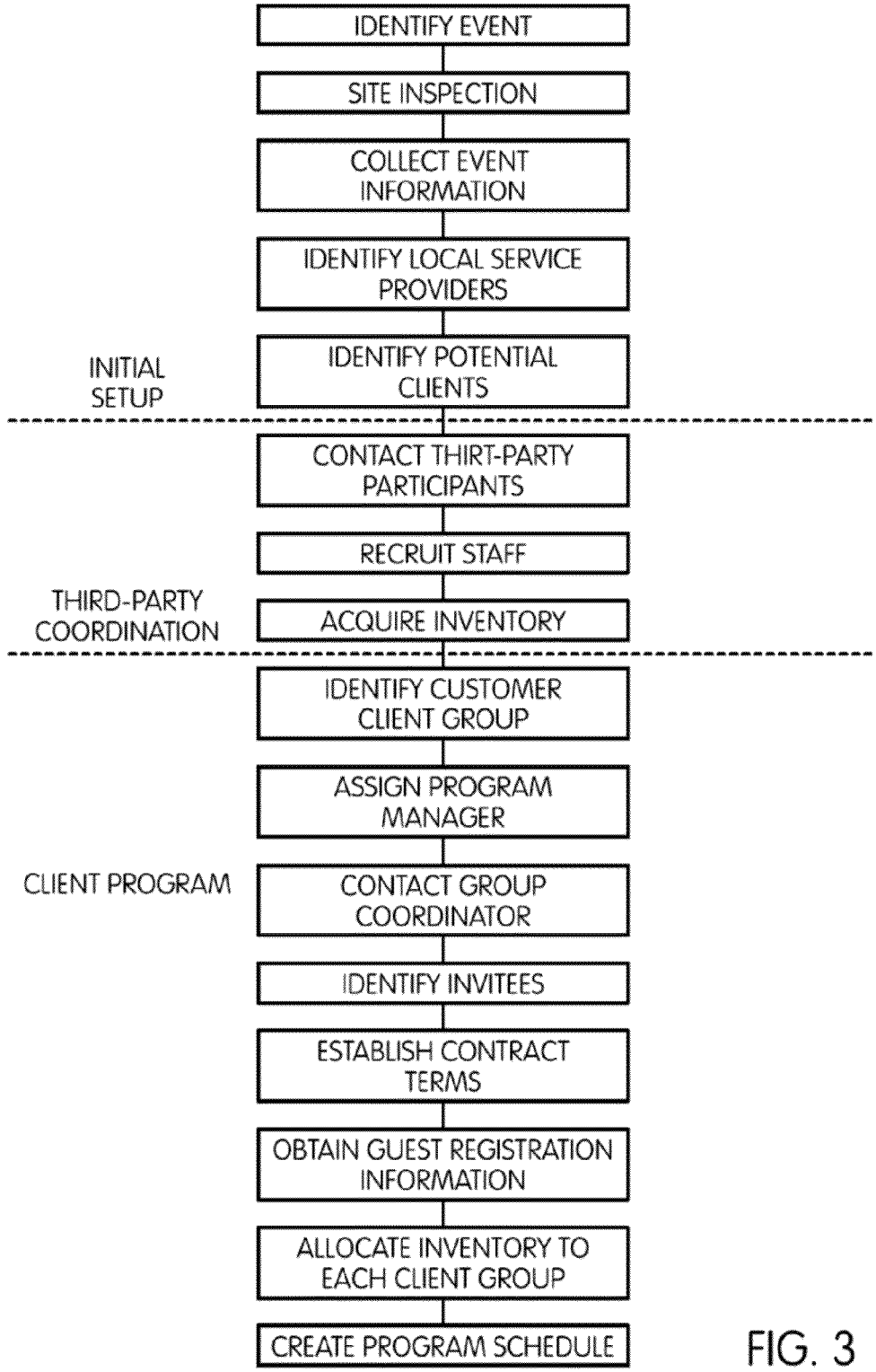
FIG. 3 is flow chart for the method of performing pre-event activities, according to an embodiment of the invention.

Pre Event Planning:

Event related and hospitality program parameters may include, but are not limited to, event tickets, accommodations (e.g. hotel, condominium, home share, hostel, and other accommodations), transportation (e.g. van pools, bus, taxi, car service, etc.), food/beverages (e.g. breakfast, lunch, dinner), and/or staff (e.g. hosts, drivers), entertainment between events, collateral for the event (e.g. mailers, welcome kits, signage, and other collateral), and gifts (e.g. event memorabilia, postcards, pictures, souvenirs, event collectables, pins, buttons, gift cards, and other gifts). As depicted in FIG. 3, the pre-event activities may be separated into at least three parts: initial event set-up, third party coordination, and client program. Pre-event activity begins internally with the initial event set-up including identification of an event or events for which the event management system 2 will provide hospitality programs and packages. The initial event set-up includes various aspects of identifying an event (e.g., an Olympic event), obtaining information and inventory of event related items (e.g., ticket information, accommodations, restaurants and other hospitality venues, potential local service providers etc.), and entering the information and inventory into the system. Initial event set-up will determine potential local service providers (e.g. hotels, restaurants), public transportation routes, road maps, weather conditions during the event, event venues, venue seating capacities, available tickets, and other information needed to plan hospitality program for a large number of groups.

A program director begins by collecting hospitality inventory for the event according to the event site inspections. Third party coordination may involve contacting and forming partnerships with local hospitality providers. After an event is set up by the hospitality program provider, the hospitality program provider may coordinate and/or contract with third party participants (e.g. local service providers) to provide resources for the hospitality programs to be provided. For example, blocks of hotel rooms may be obtained from one or more local hotels (or other accommodations providers) in order to provide accommodations for group guests. These hospitality providers may be best characterized as third party participants 19, who may supply the event management system 2 with hospitality inventory items (e.g. hotel rooms, apartments, vehicles, food/beverages, tickets, staff). Other third-party service providers may include, but are not limited to, transportation providers, staffing agencies, individual staff, entertainment, food and beverage venues, customized gift vendors and other third party providers. A contract may be established with these third party participants to provide a certain number of hospitality items (e.g. rooms, vehicles, food/beverages) which may be collected and managed in an inventory by the hospitality program providers. A large inventory of hospitality items provides more options when making group arrangements.

Another part of the pre-event planning includes client program. After overall event and inventory has been at least initially set-up, a client program may be created for every client group. With the help of program directors, program managers, group coordinator representing a group and guests of the group, the client program may be established. The group may be a corporate group, or other type of group. A group coordinator sets the initial specification of corporate or group hospitality program parameters for the overall group hospitality program. The parameters may include number of guests, budget, arrival/departure time, event selection, entertainment request, gifts, and other parameters desired to create a customized hospitality program. Parameters may also be specified in a contract between the group coordinator and the hospitality program providers. The hospitality program provider may assign a program manager to each group and program directors to oversee inventory items. According to the hospitality parameters provided by the group coordinator, the program directors may begin to customize the groups hospitality program by allocating hospitality items (food, beverages, accommodations, entertainments venues, event tickets, transportation, gifts/collateral, and/or other hospitality items) to the group. Program managers plan and assign the allocated hospitality items for the guests including assigning allocated accommodations for guests, arranging for local transportation (e.g. to/from airport, hospitality venues, optional events and/or other transportation needs), coordinating gifts and/or collateral for groups/guests and other pre-event activities.

Additionally, the invitees or guests of the group may supply additional pieces of information by registering through the system and/or providing additional information/preferences. Registration may include two parts including initial registration information and event specific information. Initial registration information including general guest information such as mobile phone number, pager, email, address, fax, languages spoken, emergency contact, passport number. Initial (or updated) registration may be used again for future events. The registrant may also provide event specific information including arrival/departure times, accommodation preferences, dining preferences, among other things. Allocation made by the program manger may further be defined using the guest registration information. A guest may also register their mobile device with the system in order to receive on-site updates when they arrive at the event. Guests without mobile device capabilities (or without mobile devices that will function in the even locale) may submit a request to be supplied with a mobile device upon reaching the event. A mailing schedule may be executed for sending guests save the data cards, invitations, RSVP, Thank you for accepting cards, and event information via mail or electronic mail. Mailings before the actual event provide guests with pre-event information and reminders to help corporate groups prepare for the event.

Group coordinators, invitees, program directors and program managers define all (Or most) parts of a hospitality program including program schedule, program timeline and specific allocation of hospitality items (e.g. accommodations, tickets, transportation, schedules). During the creation of a hospitality program it may be determined that additional services from third party participants may be desired. Based on demand and number of people, additional inventory can be purchased by the hospitality program providers in order to ensure guests have sufficient arrangements.

Yet another external participant is an individual guest(s) 17, individual guests may or may not be associated with a corporate client. Individual guest may be offered the ability to purchase hospitality on an individual basis based on prepackaged hospitality. The method for creating and managing multiple hospitality programs and/or hospitality packages includes an inventory of hospitality items used to accommodate each client group and/or individual guest. FIG. 3 is a flow chart of the method for pre-event managing of both client programs and online sales, according to an embodiment of the invention. First, the hospitality items must be acquired so that the inventor may be sufficiently stocked with hospitality items needed to fulfill the corporate client and guests needs during the event, as discussed above. These inventory items may be based on prearranged contracts and/or business agreements between the corporate client and management personnel responsible for arranging the hospitality programs and hospitality packages. Agreements with hotels, restaurants, caterers, event organizers, vehicle operators, and employees may be used to create inventory items. For example, the event organizers may allocate a certain number of tickets and hotel managers may reserve one or more block of hotels for clients of the management system. This allows the management personnel to reallocate the inventory items to best fit client needs.

Following the acquiring of inventory items, the event management system 2 determines whether or not a customer is a corporate client requesting a full hospitality program in step 202. If not, the method proceeds to step 209 to determine whether the guest is requesting an on-line sales. If the client is a corporate client group, a hospitality program is created based on guest profile information collected from each individual guest in step 203. Step 204 uses guest registration information to determine the dates of arrival and departure along with guest preferences in order to allocate inventory items such as hotel rooms, transportation and most importantly event tickets. Also included in step 204 is the group coordinator establishing hospitality parameters, perhaps in the form of a contract for invited guests. After the hospitality items have been arranged, a hospitality schedule may be created in step 205, wherein the main factor in creating the schedule is the event for which tickets have been allocated. Step 206 communicates the hospitality schedule to the client group and each client guest within the client group. If any changes may be desired in step 207, the management personnel may choose to reallocate the inventory to best complete the client's request, otherwise the method for creating a hospitality program may be replenished with more hospitality items for other client groups.

Step 209 determines whether an individual guest is seeking to purchase a hospitality package. Hospitality packages may be predetermined to include event tickets and/or any combination of accommodations, transportation, and/or food/beverage. Step 210 allows hospitality packages to be viewed, searched, and/or selected by each individual guest through an internet on-line sales portal provided by the management system. Following the selection of a hospitality package the order is made. The guest has a predetermined time to confirm the order, in the meantime the hospitality package is labeled as "pending". After the guest confirms the order, the status of the hospitality package is changed to "confirmed" in step 212 followed by step 213, the removal of the hospitality package from available inventory at which time management personnel may choose to acquire more inventory based on the number of purchased inventory items.

Inventory may be acquired based on the number of clients requesting the use of the management system. Therefore, the method for acquiring more inventory may be automated to request more inventory based on forecasted client demand and individual on-line sales. For example, if the demand is high, the system may purchase additional accommodations by automatically emailing or notifying third party participants (e.g. hotel managers, condo owners) who have previously supplied the inventory with accommodations. Acquiring inventory may include at least an estimated number of corporate client, client guests, and individual guests.

On-Site Event Activities

On-site event management may include the timed execution of each scheduled item in the program schedule. From the groups arrival to the groups departure, aspects of hospitality may be executed according to the program schedule. Upon arrival and during the event, corporate client's guests may be met and escorted by hospitality staff. At arrival a driver may be arranged to pick up the guest according to travel information entered by the guest during the pre-event activity stage. Drivers will be supplied with guest information in order to facilitate quick and easy pick up. The guest or group may be driven to the hotel, where upon arrival and check in to the hotel each guest may receive a welcome kit. Followed by guest credentials or ID cards to be used to identify a guest as group member. The execution of these aspects may be coordinated by host or hostesses of the hospitality program. A group may then be driven to event venues, prearranged dining establishments, entertainment venues and other location according to the program schedule. During events, a group may be provided with on-site signage, a feature beneficial to corporate groups wanting to advertise their participation in the event. Before departure from the event, the group may be supplied with departure notices informing them of transportation back to the airport and the closing of any open account balance accrued by a guest.

In order to ensure staff and guests may be made more aware, a mobile devices may be provided to each guest of the group. Or the system can be made compatible with the guest's existing mobile device that functions at the event location. Either way, a group, guest profile, and staff profile may be maintained to include mobile device identification and instructions on how to send information and contact each mobile device assigned or belonging to the guests and/or staff. Optionally, a mobile device may be embedded with GPS tracking chip which allows the user to be located. Staff members may also be equipped with GPS mobile device capabilities. Update's may be arranged based on group, guest and/or staff profiles, wherein real-time updates may be received based on profile information. Also available through the on-site mobile device communications is the ability to receive daily schedules, receive event information, receive hospitality information, and request additional hospitality arrangements. On-site activities allows users to view the most up to date scores from other events of interest and includes real-time updates regarding hospitality arrangements, while providing staff a complete view of the current execution of the program schedule. Mobile devices may be connected through local wireless access point or cellular internet connection, to interface with pieces of the event management system 2 to receive real-time reports based on daily program schedule, event changes, updates, alerts, transportation schedule, additional transfer request, and/or vehicle/driver allocation.

Figure 5:
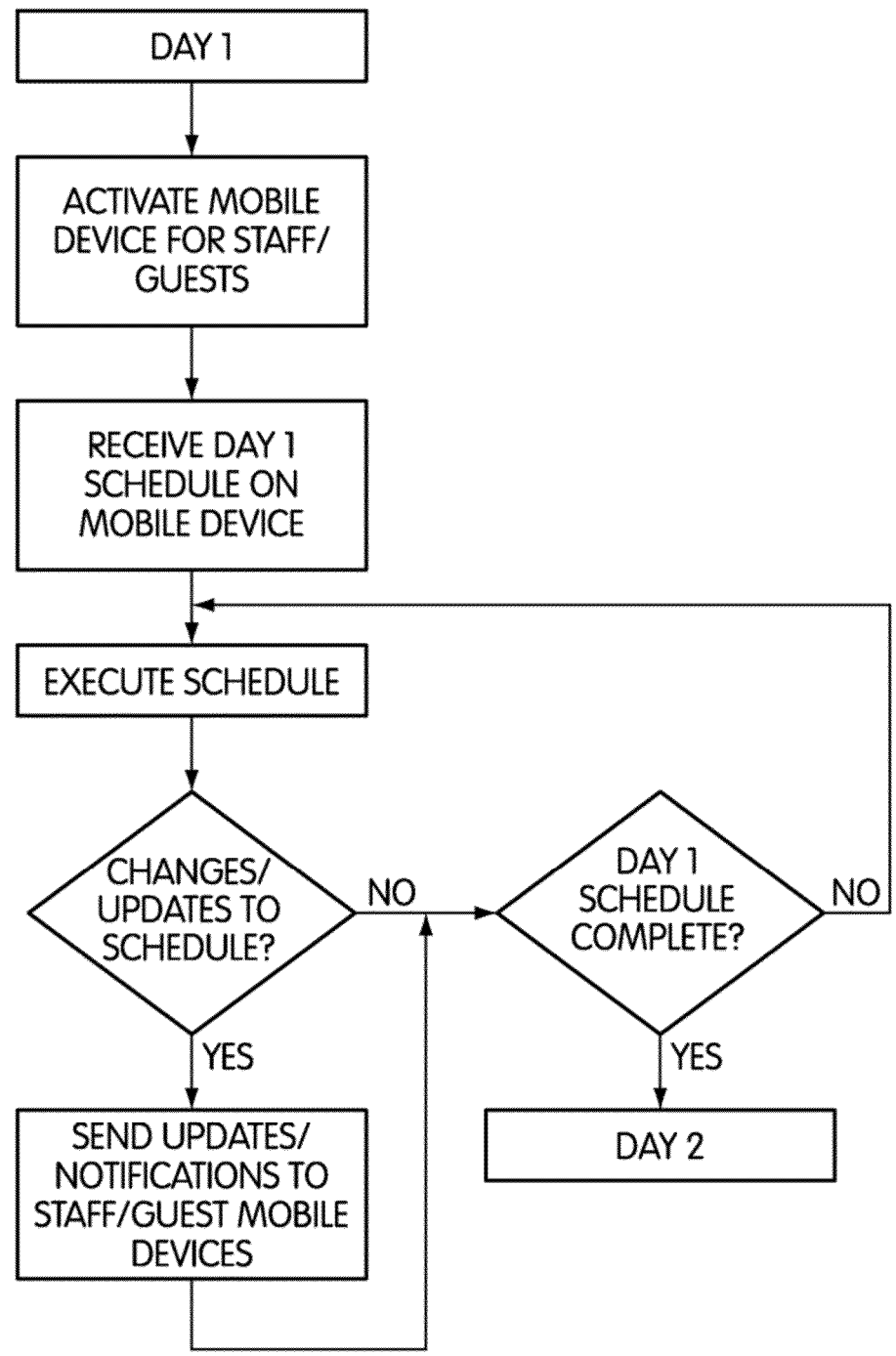
FIG. 5 is a flow chart for the method of performing on-site activities, according to an embodiment of the invention.

As depicted in FIG. 5 each staff and guest mobile device is activated at Day 1 of the event and daily schedules may be sent to each device in order to execute the schedule. Any changes or updates to the schedule may be sent to the corresponding group and staff members until the Day 1 schedule is completed. This procedure is followed until the end of the final day of the event. Thus, mobility allows program managers and support staff the ability to adapt to real-time events in order to provide quick response to the group's needs. A live schedule may be tracked by staff members during the days of the event to ensure the program schedule is kept and executed according to plan. However, if changes do occur, the management system 2 can be modified to record the changes. Alerts based on changes may be sent out to predetermined users of mobile devices to further ensure that staff and guest may be notified of changes to a schedule or hospitality arrangements.

The event management system 2 may include on-site interactive communications during the event and execution of hospitality program. Optionally, a mobile device may be embedded with GPS tracking chip which allows the user of the mobile device to be automatically located. Staff members may also be equipped with GPS mobile device capabilities. Mobile devices may be connected through local wireless access point or cellular internet connection, to interface with pieces of the event management system 2 to receive real-time reports based on daily program schedule, event changes, updates, alerts, transportation schedule, additional transfer request, and/or vehicle/driver allocation.

An added service to corporate groups is an event information feature which allows mobile devices assigned to the corporate groups to receive event information regarding such things as live event scores, athletes standings, player statistics, instant reply clips, venue maps, seating diagram, weather reports, and other event related information. The event information feature of the mobile device adds greater value to the guests of the corporate event. Not only can it receive full hospitality arrangements but may also have the added benefit of being able to receive real-time information regarding other events happening at the same time. For example, during an Olympic event there may be multiple sporting events occurring simultaneously. While attending one of these events, a mobile device may provide a group with live updates from another event.

Another feature of on-site activities allow corporate groups to request additional hospitality arrangements. For example, the event management system 2 allows guests to request additional vehicle transportation between event, dining, and lodging locations. If at anytime a corporate guest would like to receive hospitality arrangements that exceed the prearranged hospitality items, the corporate guest may choose to purchase the additional arrangements on their own. This may be helpful for guests who wish to upgrade accommodations if corporate accommodations may be insufficient. Although, each corporate guest is best accommodated during pre-event activity stage, a guest may change his or her mind once they have reached the event.

Post Event Activities

Figure 6:
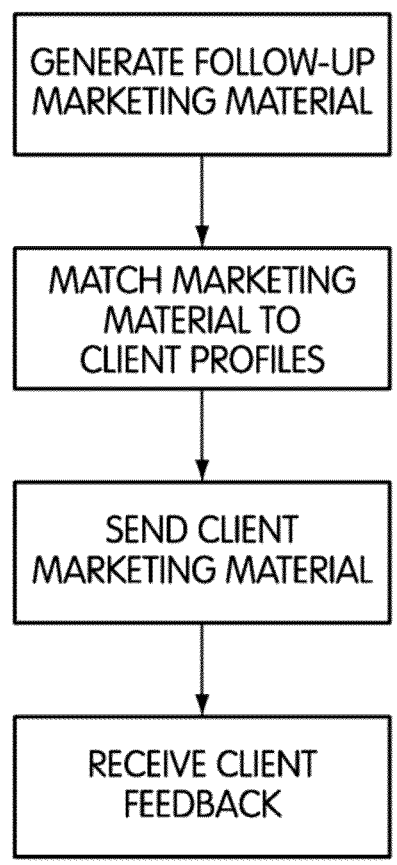
FIG. 6 is a flow chart for the method of performing post event activities, according to an embodiment of the invention.
Figure 8:
FIG. 8 is a screen shot of a manager profile, according to an embodiment of the invention.
Figure 9D:
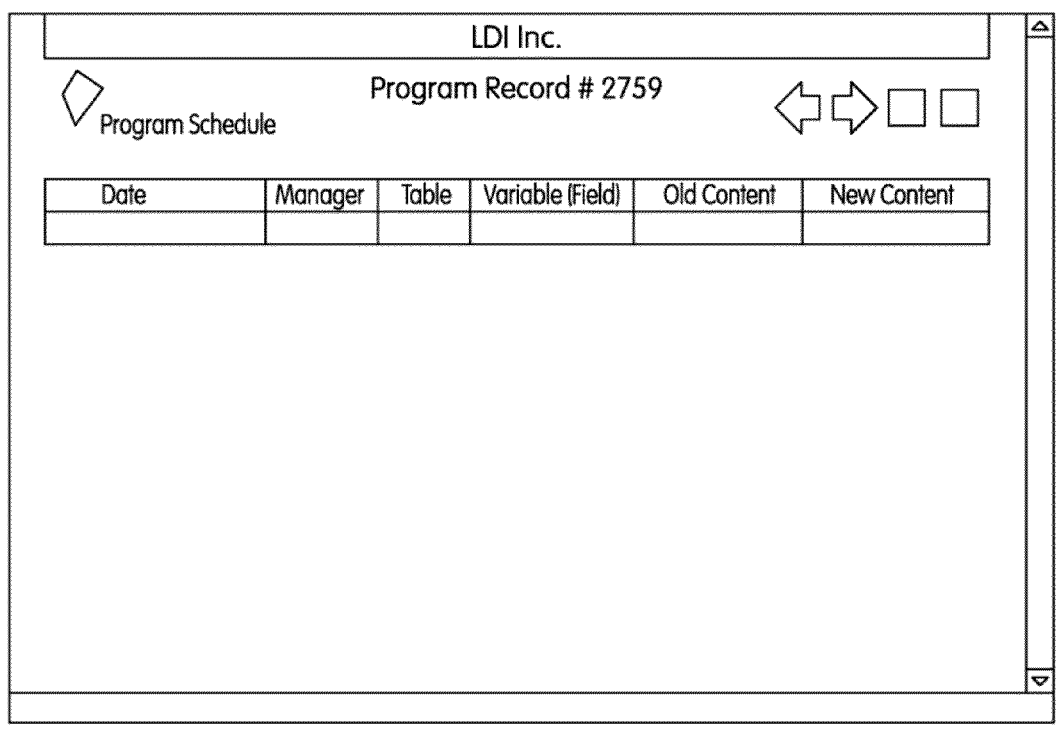

FIG. 6 shows a method for conducting post event activities wherein follow-up material is generated and matched to client profiles, (e.g. corporate client, guests, online customers) and then sent to the client. The marketing material may elicit feedback from the client allowing the hospitality program providers additional information on future events and referrals to other potential client groups. Post event activities may be implemented for corporate clients and individual guests of the management system 2. For corporate groups, each guest and/or the group coordinator 13 may be targeted to receive follow up marketing information including, but not limited to, future events, event memorabilia, accommodation specials, and/or dining specials. Furthermore, as a corporation, organizers of other events may be interested in forming partnerships and/or event sponsorship opportunities with a corporation that has a known interest in a particular type of event. A corporate profile, group profile and individual guests profile may be maintained for these purposes. Previous event and hospitality related information may also be maintained in order to quickly assemble new event hospitality programs based on the maintained information and any additional information that may be desired.

Post event activities may be implemented for corporate clients and individual guests of the management system 2. For corporate groups, each guest and/or the group coordinator 13 may be targeted to receive follow up marketing information including, but not limited to, future events, event memorabilia, accommodation specials, and/or dining specials. Furthermore, as a corporation, organizers of other events may be interested in forming partnerships and/or event sponsorship opportunities with a corporation that has a known interest in a particular type of event. A corporate profile, group profile and individual guests profile may be maintained for these purposes. Previous event and hospitality related information may also be maintained in order to quickly assemble new event hospitality programs based on the maintained information and any additional information that may be desired.

Staff profiles may also be maintained for future recruiting purposes. Staff from previous events hosted by the hospitality program providers may be recruited to work for future events. Information such as location, language skills, age, and particular knowledge in an area may be used to recruit skilled and experienced staff. Referrals to potential other staff members may also be considered in future hiring process.

Post event activities may also include sending a survey or evaluation form to each guest in order to rate their event and hospitality experience. This information may be recorded and used for future event hospitality programs for the corporate group or other corporate groups. In addition, each corporate group may receive thank-you cards and/or gifts from the management system 2 as part of the contract agreement. In order to customize a gift, a corporate logo in combination with event symbol may be included. These post event activities may be also used to create client loyalty so that corporate groups plan future events using the management system.

Management System Components

The method provides an interactive, dynamic inventory management and reporting system for aspects of a hospitality program created for a client. The client may include a corporate entity or organizational entity wanting to arrange event planning and accommodations for their guests. The management system 2 may register the group of guests under the client. Accordingly, hospitality program parameters may be specified for a client hospitality program for the group of guests. The management system 2 integrates input and other information from internal and external participants to assemble a customized client hospitality program and/or packages. An on-line sales component allows individual guests (e.g., not associated with groups) to purchase customized hospitality packages directly from the management system. Hospitality packages may include one or more of accommodations, transportation, food and beverages, event tickets and/or other hospitality related items. Alternatively, the hospitality package could include a customized combination or a single hospitality option. Regardless of the actual hospitality program eventually assembled for the client and/or individual guests, an inventory database provides a full report of available hospitality items to a management team assigned the duty of creating the client hospitality program and assigning specific items to guests or individuals. Some or all of the assignments may be automatic.

According to some embodiments the method of management is a web-based application based on Microsoft SQL Server and Microsoft ASP.NET technology which allows rapid response to client requests. The Microsoft SQL Server relational engine supports high speed transaction processing. Microsoft Active Server Pages is a server side scripting environment that is used to create and run dynamic interactive web server applications. ASP allows the combinations of HTML pages, script commands, and COM components to create interactive web pages as part of a powerful web based event management system that are easy to modify and customized for each client on the fly, based upon their actions or requests.

According to FIG. 1, a event management system 2 for carrying out the method disclosed is divided into management departments, each of which controls a different aspect of the hospitalities offered. FIG. 1 shows a management system 2 comprising management modules for accounting 22, ticketing 24, accommodations 26, food and beverages 34, online sales 30, transportation 32, marketing 23, reporting 29, guest registration 27, websites 25, employment 28, communications module 33, and/or user interface modules 31. The inventory database 4 may store information relating to accommodations 36, event tickets 38, hospitality packages 40, food and beverages 42, transportation 44, hospitality passes 46, and/or staff 48. A customer database 6 may store corporate profile, guest profiles, and on-line guest profiles. An allocation database 8 may store program timeline, program schedules, guest registration information, allocated accommodations, transportation, staff, gifts, and event tickets. The event management system 2 communicates via both intranet 16 and extranet 18 through a communications module 38 which enables network communications through either wired or wireless communications.

Linked to the same private network as the management system is a hospitality program provider which includes a director corresponding to each of the management department. Also included may be program managers for each client group (e.g. corporate client 10). Each program director is responsible for a corresponding part of the inventory database and oversees aspects of acquiring and allocating the corresponding hospitality inventory to clients and guests. Each client is assigned a program manager for coordinating the allocated hospitality items for each client. The program manager may or may not be limited in their ability to access the inventory database, however, can choose to request more or update client hospitality items from the corresponding program director. Each program manger is focused on providing the already allocated services to the client. Additionally, the program manager is the point of contact for each client. A client, for example, a corporate client 10, has a group of guests 12, which include employees, invitees, and their additional guests 14. A corporate event coordinator 13 is the main point of contact on the client's side and manages the overall number of invitees. Other responsibilities may include determining who should be invited, number of additional guests and the client's budget. FIG. 1 also shows that a number of clients having the same or slightly different configurations as example corporate client 10, also accessing the services of the event management system.

Also linked to management system may be individual guests 17, employment applicants 15, and third party participants 19. Individual guests 17 may purchase hospitality packages with predetermined set of hospitality items through the on-line sales web site. Potential employees and staff for the hospitality program, such as hosts and hostesses may apply for employment through the management system as well. Though a management system web site, applicants may fill out employment applications which may be saved into the inventory database for reference by the employment management department 28. And, third party participants may include package resellers and/or service providers (e.g. drivers, restaurants, hotels, etc.). Service providers may provide the event management system with hospitality inventory items. As an added benefit, hospitality packages may be purchased by third party resellers, making the management system more of a supplier than just a service provider.

For FIG. 1, each management component, inventory item, and database is explained. According to FIG. 1 three databases are depicted to show an inventory database 4, customer database 6, and allocation database 7. Inventory database 4 may include available hospitality items that have yet to be allocated to a group or online guest. Customer database 6 may store profile information for users of the management system including corporate profiles, guest profiles, on-line guest profiles, and staff profiles. In addition to profile information, the customer database 6 includes mobile device information for on-site management. This information may include how to reach mobile device, and types of information that should be sent to mobile device. The allocation database 8 stores information regarding allocated inventory and client program information. Such items as, program schedules, program timeline, guest registration information, allocated accommodations, transportation, staff, gifts, and event tickets may be maintained for each group. Therefore, the allocation database 8 can best be viewed as a combination of inventory and profile information, wherein as soon as available inventory becomes allocated to a group or guest, the association gets stored as an entry in the allocation database 8. For FIG. 1, each management component, inventory item, and database is explained.

A communications module 33 allows the management system to communicate via wired, wireless, satellite, PSTN, and/or fiber optic connections, among others. User Interface module 31 provides a program manager, group coordinator, guests, and third party participants restricted access to the management system using different login and password credentials. Information may be displayed via a customized web page provided by web site module 25. The information may include reports based on allocated inventory.

Administration component 20 may be used for creating and maintaining program manager profiles including, assignment of program managers to groups and/or guests, specific program manager roles and/or program manager permissions. A program manager may be supplied with an interface limited to the boundaries set within the profile. The pre-event activity steps may be used to coordinate as many aspects of hospitality before the arrival of the guests at the event location.

The accounting management component 22 provided by the management system 2 maintains a cost breakdown of items within the inventory and for each client group. Accounting reports allow accounting directors and program managers to control cost, perform financial analysis, manage budget, and provide forecasting. Thus, hospitality programs for each client may be created to stay within budget, while on-line sale figures may be used to forecast the need for more inventory. Excess inventory may be calculated and used to determine new allocations and sale prices. Reports may be posted to accounting software of a program director or program manager's preference.

The marketing component 23 accesses the collected customer profile information from database 6 based on corporate profiles, guest information, and individual (e.g. on-line customers) guest information. The present system allows client information, as it is received, to be stored at the customer database 6. After the completion of a successful hospitality program and event, clients and clients' guests may be interested in follow-up information regarding similar events for which the client and/or individual guest may have an interest in attending. Client information may also be shared with these other event organizers as a set of potential clients to target for future events, related merchandise and memorabilia. As the client list grows, the management system may market the client inventor information to even more event organizers, merchants, and/or service providers. Since client information can be saved for subsequent events, the process of providing follow-up hospitality programs becomes more efficient and reliable for clients and their guests. For example, a guest will be more motivated to attend an event knowing that the hospitality program will be similar and as satisfying as the hospitality program provided at a previous event.

The management system 2 enables a ticketing system 24 hosted on the secure server with secure access to only authorized management/personnel. The ticketing system is fully interactive with the client hospitality program schedule from the initial import of the selected ticket allocation into the schedule to the tracking of any additional sales. Event ticket information includes event time and duration. This information forms the program schedule for which other items may be scheduled around. A ticket inventory is created based on the event organizers responsible for distribution of tickets. Tickets may be allocated to a client group and such information is loaded into the client groups home page and program schedule to form the backbone of the event hospitality program schedule. Other aspects of the hospitality program may be used to accommodate and facilitate the attendance at the event(s) for which tickets have been allocated and sold. A ticketing director may allocate a number of tickets in the inventory for on-line sales and may choose to change these allocations at any time. Thus, the ticket director has the ability to track and monitor the entire inventory of tickets, ticket sales by quantity, value and purchaser, and also the excess unsold or unallocated inventory. Seat assignments may also be made according to online seating diagrams and venue diagrams. Therefore, a guest requiring special arrangements may be accommodated during the event.

Custom website module 25 and reporting 29 may function together to present groups with detailed views of allocated hospitality items from allocation database 8. Each client may access a custom group web-site which reports the program timeline, program schedule, guest registration information, allocated accommodations, transportation, staff, gifts, and event tickets stored by the allocation database for each group. In this manner, each module allows the full integration of information regarding hospitality and group information.

Internal inventory management and reporting allows a program director to create and manage inventory items. For accommodations management 26, an inventory of each hotel 36 is created in the management system 2 with the criteria for room number, floor location, maximum capacity, cost, amenities, beds, view, furniture, and dates of availability. Once a room is created, the management system 2 uses the criteria to provide an accommodations director the ability to search for, and subsequently allocate, reserve or upload to on-line sales component, the entire inventory, based on any, all, or some of the criteria. Accommodations are not limited to hotels. Apartments, home shares, and condominiums, may also be included. The accommodations director may search the inventory of each accommodation and perform tasks like view room inventory details, view rooming sales and excess reports based on online sales information, block or reserve one or more rooms by client group or individual guest for a period of time; generate a reservation form and email the reservation form to the client and/or guest; and view summary of total rooms by pending reserved, confirmed and available status. The program director is allowed complete access to the entire accommodation's inventory, via a personalized login and password. Each client, with a block of rooms, is provided access to their particular allocation of rooms via a dedicated home page with individualized login and password.

The accommodations director may block or reserve each room under a particular client group based on specific requirements, protocol, contract/entitlement, budget, etc. The management system 2 can accept any number of client groups and additional groups can be added at any time including specific groups for pending on-line sales. As discussed above, once a group is created, a program manager may be assigned to specific client group, each with access to that client group's specific room block. The program manager may or may not be able to add, delete or change the block of rooms but can have the ability to view specific details for each room, assign the rooms to individual guests and rearrange the assignments of rooms within their room block. The program director may still execute control over the entire inventory and alter a room block.

Guest registration module 27 communicates with customer database 5 in order to store guest, corporate and online guest information into the system. Information ranging from arrival/departure times, accommodation preferences, dining preferences, health conditions, mobile phone number, pager, email, address, fax, languages spoken, emergency contact, passport number, among other things. Each profile may also indicate mobile device information including how to reach a guest mobile device and types of information to send to the mobile device.

The management system 2 also provides recruitment, assignment and on-site activities of program staff 28. Staff information is stored in staff inventory 48. Interested applicants may apply on-line through a recruitment web site. The directory of staffing is able to manage application and the status of the employment process via the management system 2 and the staff inventory. Upon completion of the hiring process, staff is allocated to each client based upon contract terms, specific requests (male/female, specific languages) and schedules as per the guest's movements during the program.

In live-online sales 30, selected inventory can be immediately available for sales in a "pending mode." The inventory database 4 stores hospitality packages that may be sold on an individual basis apart from a client hospitality program. Sales prices may be set and an individual guests 17 can see the amenities for a particular accommodation and can select the dates of their stay. Once the purchaser selects a room, they have a time limit to complete the transaction before the room is released back into available inventory. After a purchase is finalized a confirmation email detailing the accommodation type, length of stay and the full purchase price is sent to the individual guest 17 with a copy also sent to the program director. The management system 2 may update the room status from pending to confirmed, inserts the sale price and name of the guest(s) along with the confirmation number so the sale can be tracked and reported. Based on the inventory information, an accommodation inventory report may be created listing the rooms by property, available, pending, reserved and sold status, and inventory total cost vs. total sales revenue. Reports may be exported to various application files including but not limited to, Microsoft Excel, Microsoft Word, or PDF format.

Passes to hospitality centers 46 may be sold to individual guests 17 and groups 10 and provide access to the hospitality on a daily basis. The inventory of available passes 46 is entered into the management system 2 and upon sale of a daily pass to either a group or individual, the pass is removed from available inventory and allocated to the purchaser(s). This allocation provides the food and beverages director the ability to track the number of visitors each day and subsequently the quantity of food, beverage and staff desired. In addition, the system generates reports on sales of the passes and excess inventory.

Another inventory item is transportation 44, which is managed through transportation management component 32. The available inventory of vehicles may be loaded into the management system 2 from which a transportation director can assign vehicles and drivers to a client hospitality programs. Type of vehicles to be used for each client hospitality program may be determined by contract terms and the specific daily schedule determined by a program schedule. The transportation director may monitor the utilization of each vehicle via the program schedules. A complete range of reports including usage for each vehicle and driver may be created. In an alternative embodiment, if a client or program manager has the need for a transfer that is not accommodated by the vehicles assigned to their program, a real-time request may be submitted through the management system 2 during on site execution for additional transfer transportation. The request may be received by the transportation director via the management system 2 and reviewed for available inventory to fulfill the request. As a reply, the vehicle, driver name and driver contact number of who has been assigned to the transfer may be updated in the management system 2 and alert sent to the client regarding the updated information.

Once the program schedules are determined for each client group, a food and beverages director is able to view available meal times (breakfast, lunches, and dinners) associated with each program. A food and beverages management department 34 enables the food and beverages director to coordinate with the food and beverages inventory 42. Arrangements may be made for meals based on clients budget, location, diet restrictions, and other preferences. Accordingly, each meal is arranged for based on type, location, and/or number of total meals. Full catering reports may be available within the system for meals by client, location, and/or meal period complete with cost pricing for the meals and comparisons to budgets.

A program manager may access the management system through the communications module 33 in order manage each client program. The following is a description of the management capabilities offered to a program manager through the user interface module 31 of the management system 2. Using a special login and password, the program manager may access various aspects of the management system through a series of user interfaces, described in connection to FIGS. 7, 8, 9a-9d, 10a-10f, 11a-11g, 12a-12i, 13a-13f, 14a-14d, and 15a-15e.

As depicted in FIG. 7, a program manager home page may be provided to facilitate various functions. For example, the home page may enable a program manager (or other authorized personnel) to access management modules for: administration, setup, account, timeline, schedule, food & beverage, rooms, tickets, transportation, guests, staff, and employment. Additionally, a proposals module may be provided as well.

FIG. 7 depicts a administration user interface that allows an internal participant (e.g., program manager) to be assigned to a client and/or group. The assignment may reflect the various limitation that a program manager can operate under. The interface may show A setup link may allow various setting to be customized including but not limited to user interface views. The accounts link may be a management module which allows one or more client groups to be managed with respect various elements including cost breakdown, budgeting, additional purchases, and/or billing and invoicing. These elements may also interface with various other management modules in order to provide accurate budget forecasts.

A timeline management module may include scheduling activities to be performed by internal participants during pre-event, on-site and post event periods. A program manager (or other manager) may track execution (among other things) of the event. FIGS. 9a-9d depict various aspects of the user interface that is displayed when a program manager selects "fill in", for example, various options enable the program manager to view a main schedule, a program schedule in preview mode, a main program schedule with a record edit option, and a main schedule program with a history of changes. Program managers (and group coordinators) may be provided with a "day at a glance" schedule and/or summary view. A day at a glance may map out the events of the day. A summary view may show program schedule events for all accounts managed by the same program manager (or other participant).

FIGS. 10a-10f depicts various aspects of the on-line sales interface module of this system. The on-line sales manager home page may enable a user to select from among various options including reports, orders, hospitality packages, accommodation packages, ticket packages, individual tickets, exchange rates and/or other options. As depicted in A12$_a$, if the reports menu is selected, various other options may be provided. Other user interfaces and aspects may be available.

Figure 10A:
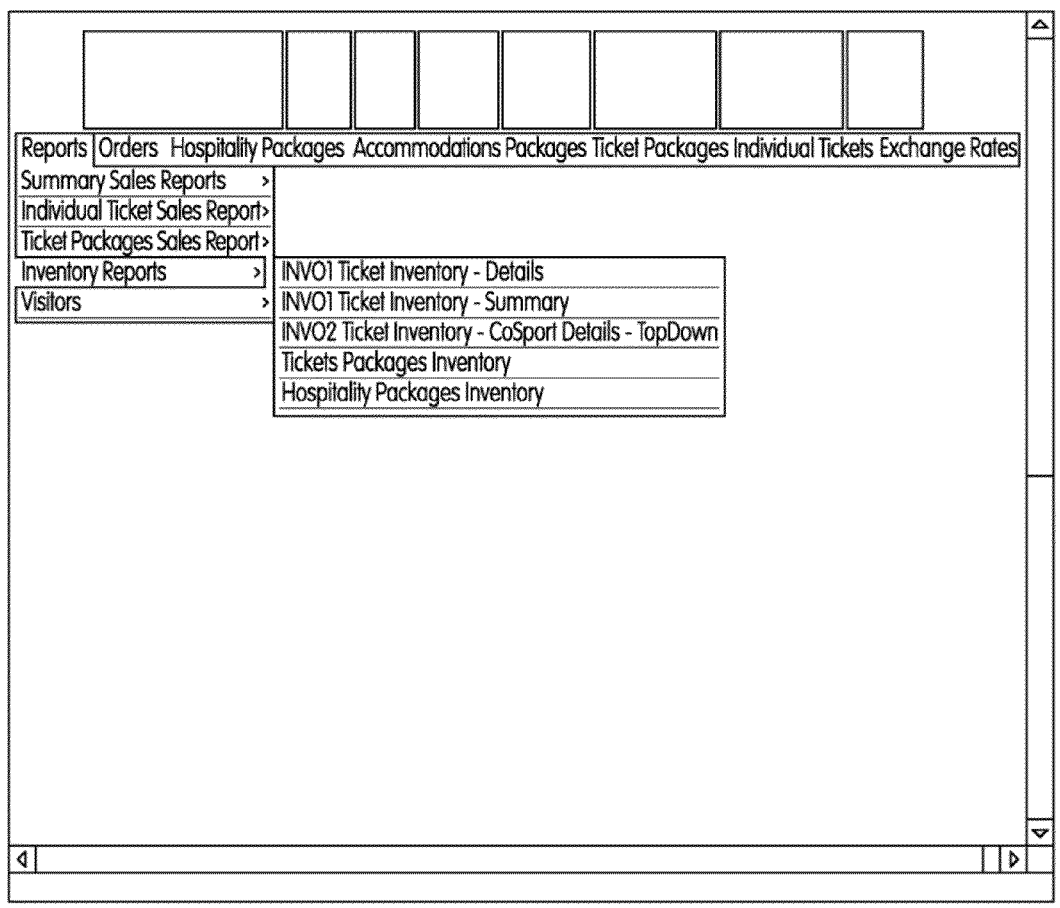
Figure 10E:
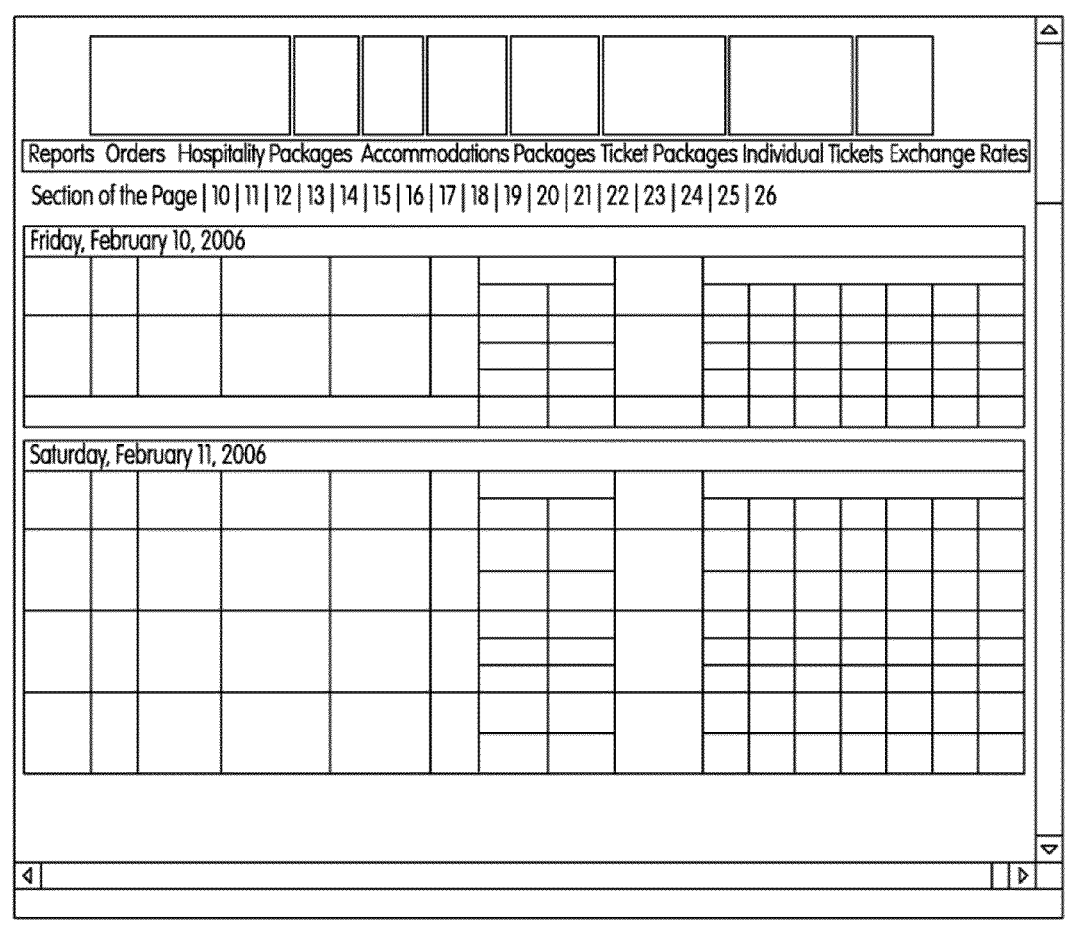
Figure 11B:
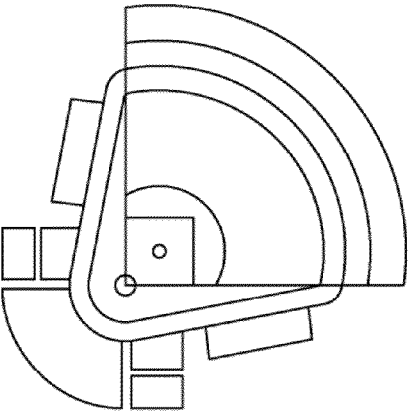
Figure 11E:
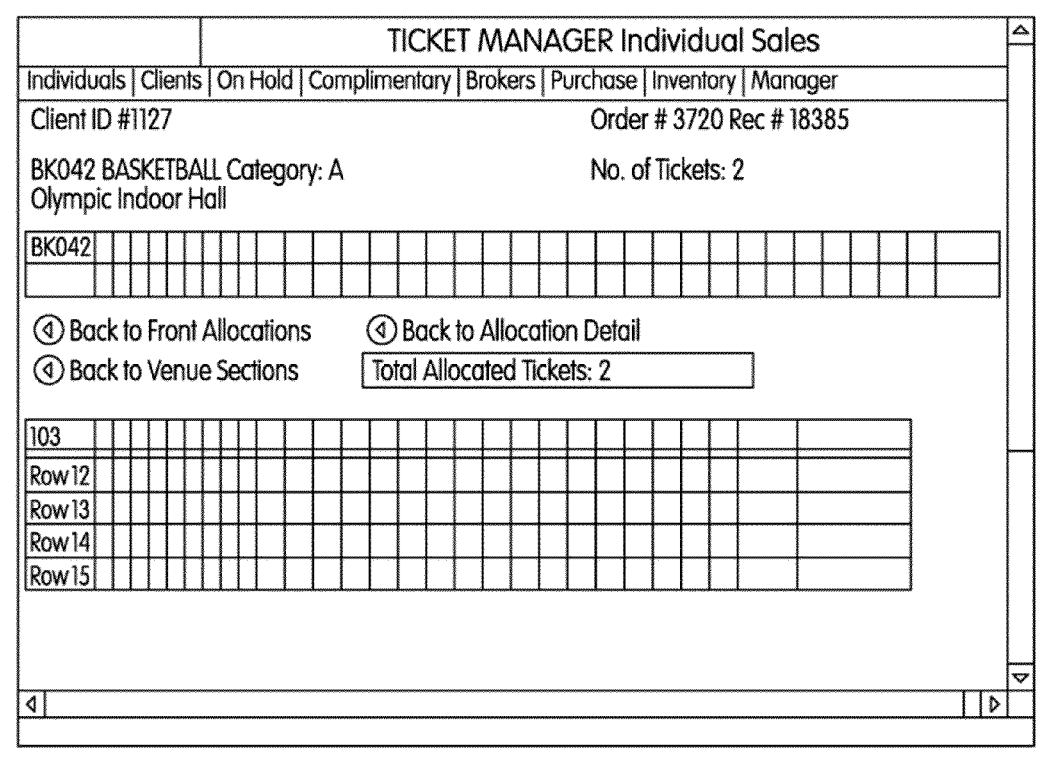
Figure 11G:
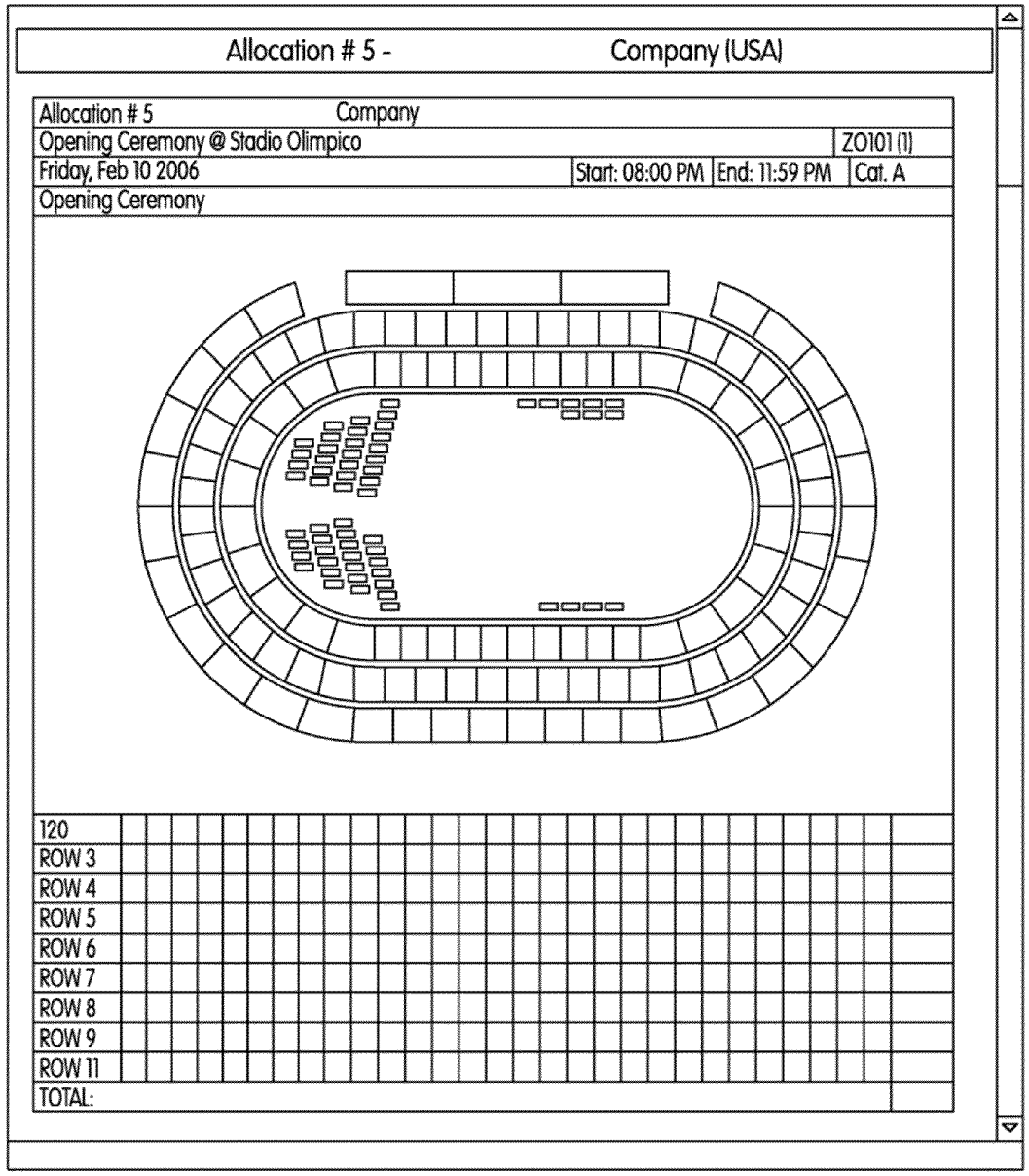
Figure 12A:
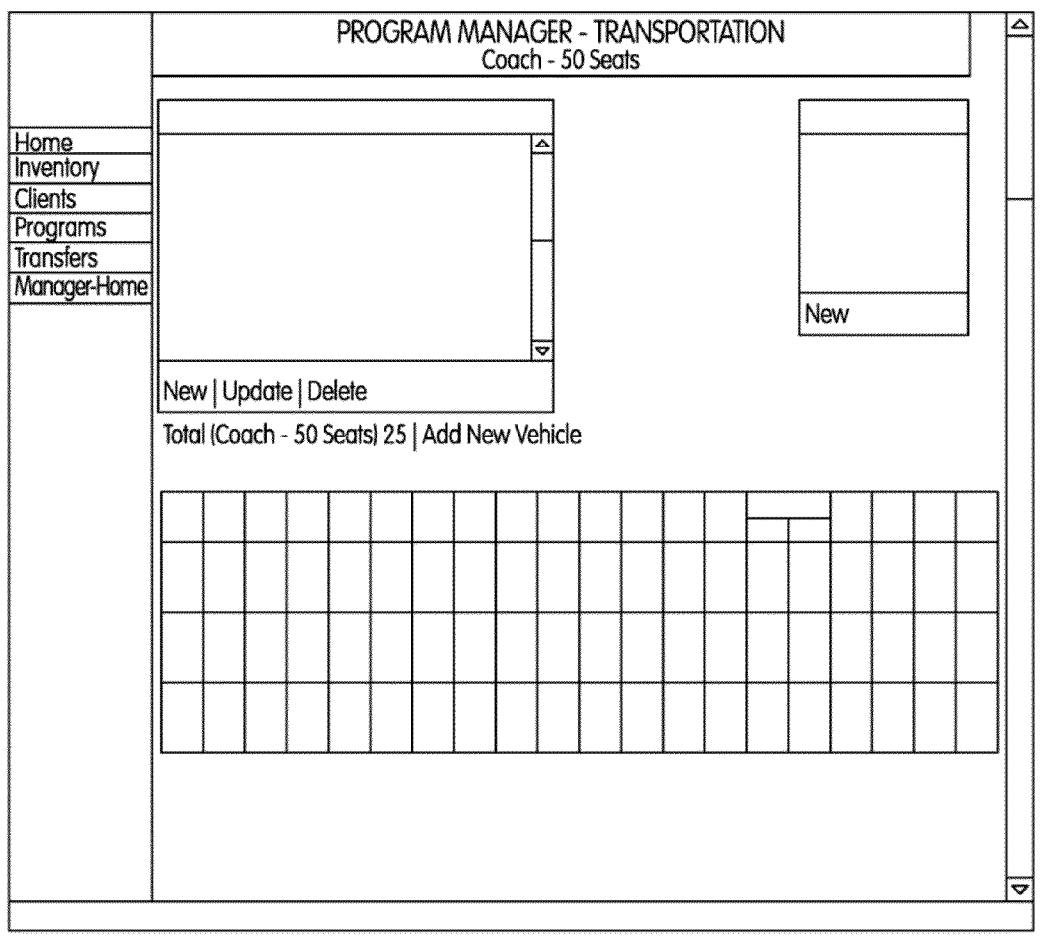
Figure 12C:
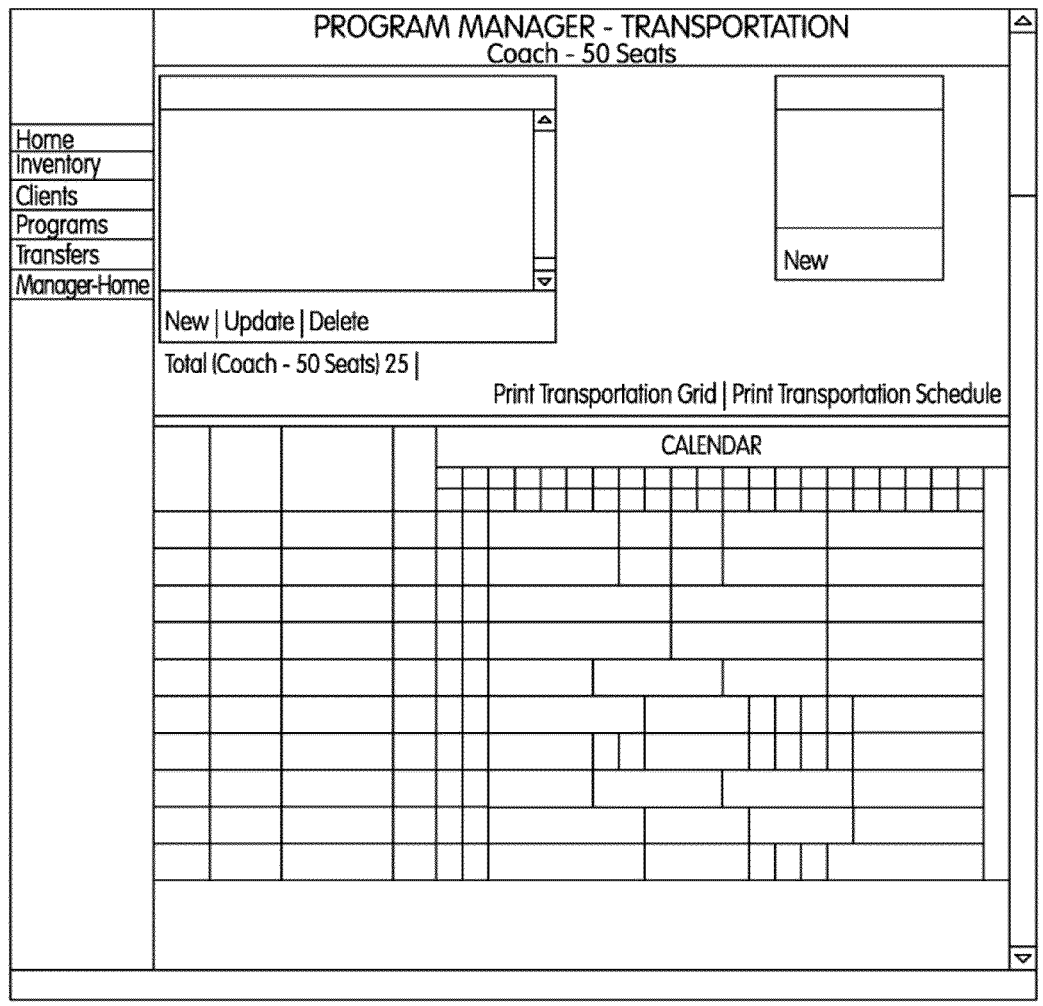
Figure 12G:
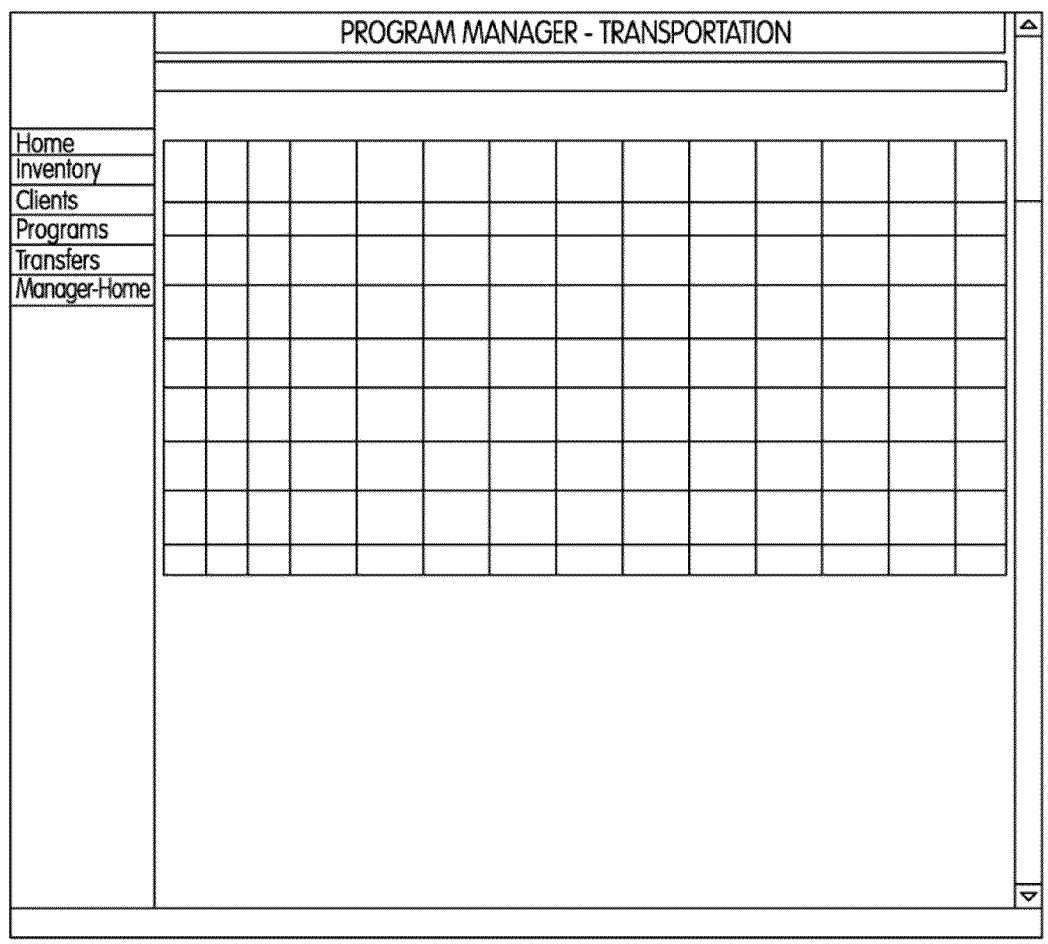
Figure 14C:
Figure 15B:
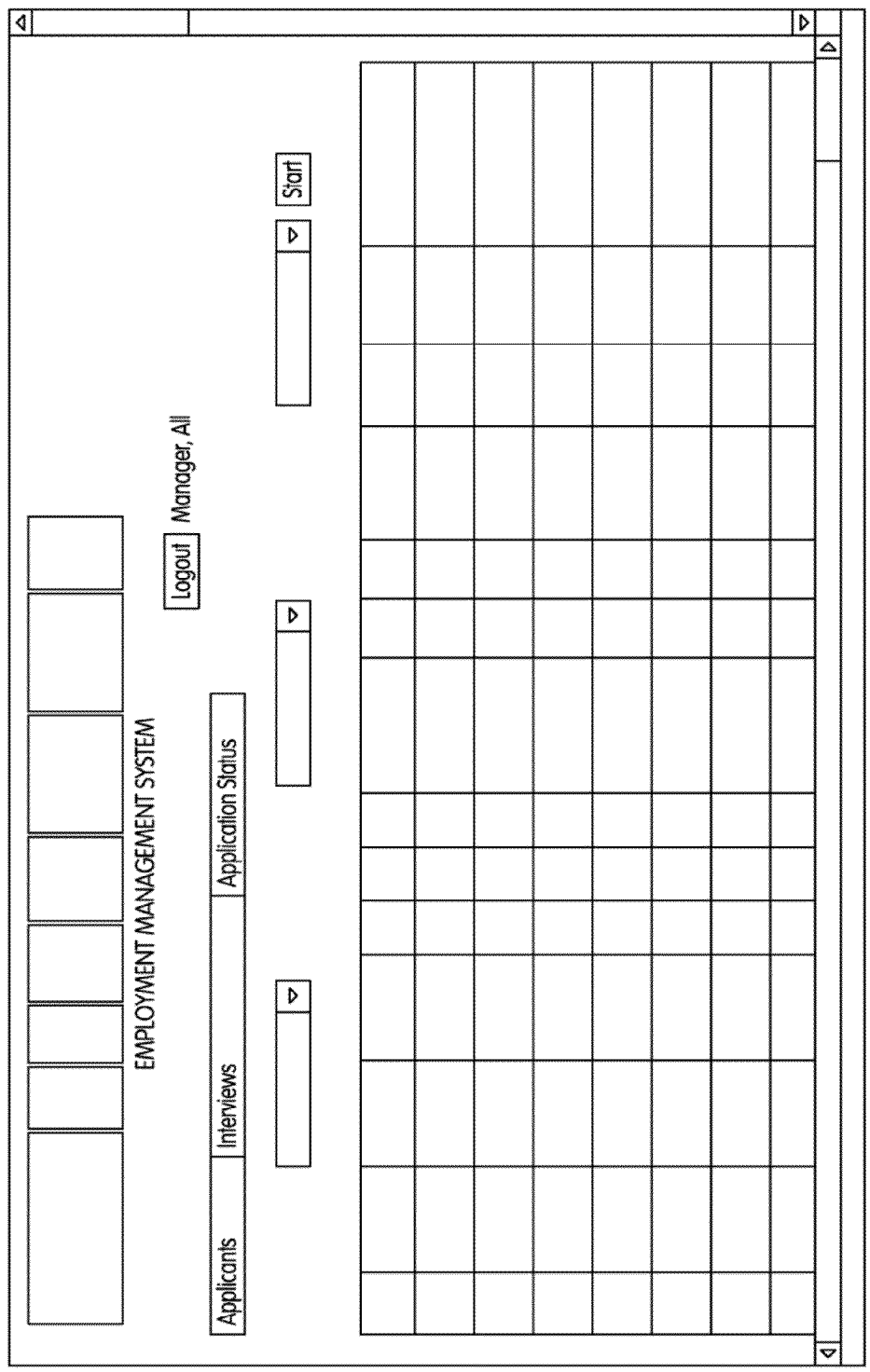

FIG. 11a-11g display an example of a ticket management inventory interface. This set of user interface screens enables a user to select from among different events, reports, sources, sports and venues, among other things. As shown for example for a given sport, the user interface may display one or more of the date of the event, the projected start time and end time, one or more codes and types, session description information, and/or venue information. If desired, the system may also display a seating charge to coordinate the existing tickets and the status (for example, available, not available, assigned, not assigned). Different screens may be displayed for individual sales and/or group sales. For example, FIGS. 10a and 10b disclose aspects of managing ticket inventory. FIGS. 10c-10c disclose managing aspects of individual ticket sales. FIGS. 10f and 10g disclose aspects of managing group (e.g., corporate client) ticket allocations.

FIGS. 12a-12i display a set of screen shots that provide examples of the user interface that may be used in connection with the transportation module. This set of program manager user interfaces allows a vehicle type to be selected from a third party participant and the fleet of vehicles that fit the vehicle type. New vehicles may be added, an update vehicle master record may be edited. A vehicle may be assigned to a driver(s) and their timelines may be created for corresponding events. A calendar view allows program manager to view the allocation of vehicles and drivers by day and time to clients, or vehicle allocation may be viewed by client. A particular client's program schedule may be viewed with respect to transportation schedules only with the option to view each scheduled transport separately. A transfer request list may be viewed and edited wherein a driver dispatch form may be filled out to request additional transportation.

FIGS. 13a-13f depict various screen shots that may be used in connection with the accommodations module of the system. Accommodations may be viewed as inventory and edited to add more inventory. A room record is created for each accommodation room. Accommodation information may be viewed and edited in calendar view, room block and rooming list. Hotel managers may also access parts of the of the accommodations module in order to track hotel guests and hotel rooms, room blocking, proposals and invoicing.

FIGS. 14a-14d depict various screen shots that may be used in conjunction with the food and beverages module of the system. A food and beverage schedule may be created including the options to print master catering schedule, master hospitality schedule, catering and hospitality contract by cost price. Meals may be planned using Banquet Event Orders which may be edited to include menu items, guest dietary restrictions, décor, beverage selection, contact person, location, billing information, and contact person. A glossary of food terms may be provided. Such information may be provided to guests who are unfamiliar with the cuisine served in the location of the event.

FIGS. 15a-15f depict various screen shots that may be used in connection with the employment module of the system. Employment user interface allows a hiring director to view application information from applicants by name, dates available, country, language, and email. Several employees may be organized within an employee list. For each employee, a resume, cover letter and photo may be uploaded to and downloaded from the management system. Employees may be selected by the skills listed in their resumes. Once the term of employment has ended (at the end of the event), employee information may be stored within a database of other employee information to be reused for future events (e.g., recruiting). The user interfaces allow applicants' information to be stored and searched by interview schedule, application status, and applicant summary.

A guests management module provides information relating to all guests and their respective groups and/or client affiliation(s). Similarly, the staff management module provides a information relating to all staff and their respective responsibilities. This information may be use to extend reporting abilities related to guests, client's group and their daily schedule, events per venue/location, transportation and other hospitality items.

Hospitality Program

Figure 16:
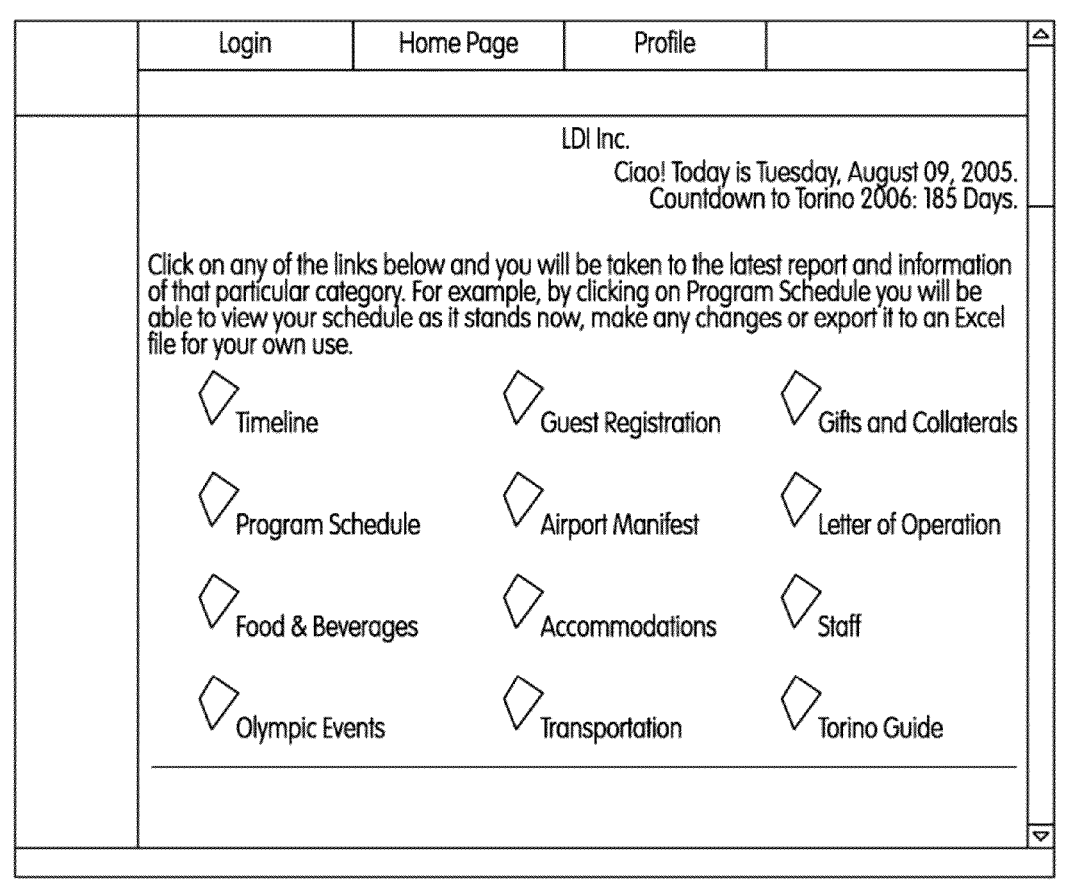

FIG. 16 is a menu demonstrating the various features of the hospitality program that may be accessed from the by the client 10, including program timeline, program schedule, accommodations, food and beverages, transportation, event tickets, guest registrations, airport information, gifts, staff, letters of operation and a city guide. A client may accesses the management system 2 using special login and password in order to view registered guests and their hospitality program schedule. Each client guest may also access parts of the management system 2 through the Internet or an Extranet in order to enter guest registration information as a new guest or an existing guest. Guest registration allows guest information, preferences, airline itinerary, and profile information to be entered and updated.

A client may access their client hospitality program via the web based management system 2 from any computer, providing the capability of real-time updates, changes and reporting. A user interface module allows group coordinator and guest access to customized web sites 25. Each client group is established in the management system 2 as individual programs and thus provided a dedicated web page within the management system 2 for reporting client hospitality program information. The program timeline is a complete program planning timeline established for each client. Included in the timeline may be the components and action items desired to insure the success of the event hospitality program. Each action item is categorized (e.g., air transportation, ticket allocation, budget/billing, etc.) and assigned a target completion date. As the programs progress the timeline is continually updated noting any additional items and current status.

Figure 18:
FIG. 18 is a screen shot of the client program view for timeline, according to an embodiment of the invention.

The timeline mode can be displayed by category or by due date. As shown, for example, in FIG. 18, when shown in category view, the user interface displays the category, a list of issues pertaining to that category, the due date for each issue, and a status field. When the timeline is displayed in preview mode by due date, the user interface may display on a monthly basis categories and issues within that category with an appropriate due date and a status field.

Figure 19A:
FIG. 19a-19b are screen shots of the client program view for Olympic events and tickets, according to an embodiment of the invention.
Figure 19B:

Returning again to the main screen, the Olympic events option enables a user to display ticket information for a particular Olympic event as shown in FIG. 19a. Selecting this option causes a display from which a user can select a ticket allocation screen depicted, for example, in FIG. 19b or an additional ticket allocation option, which allows guest to purchase or request additional tickets. Additionally, from this screen, a user may view and manage ticket seating assignments. The ticket seating assignment may include a seating chart of the stadium or other venue in which the event is being hosted, with a seating chart and an indication of the seats available and assigned to the group and/or individual members.

Event information addresses the ticket allocations including type of event, seating category, number of events and number of guests at each event. Prior to the event the client seating assignments may be available for on-line viewing. Each event to be attended will have the event seat assignment information as well as a venue map. The ticket allocation forms the backbone of the program schedule with respect to transportation, meals, leisure time and/or any other events scheduled around the event.

Figure 20A:

Returning again to the main screen, the user can select a program schedule option. Doing so displays the user interface depicted, for example, in FIG. 20a. From this screen, the user can also print a master program schedule shown, for example, in FIG. 20b. Additionally, the user can print a program schedule by groups/cycle. Cycle may include the dates of the event for which the guest will be partaking in program schedule. Additionally, an authorized user may edit the program schedule by selecting the edit program schedule option. Additionally, the user can elect to select the program schedule view by groups option which displays the user interface depicted, for example, in FIG. 20a. The guest may also have the option to download their part of the program schedule as a file (e.g., iCalendar, outlook appointment, etc.) from the user interface.

Figure 4:
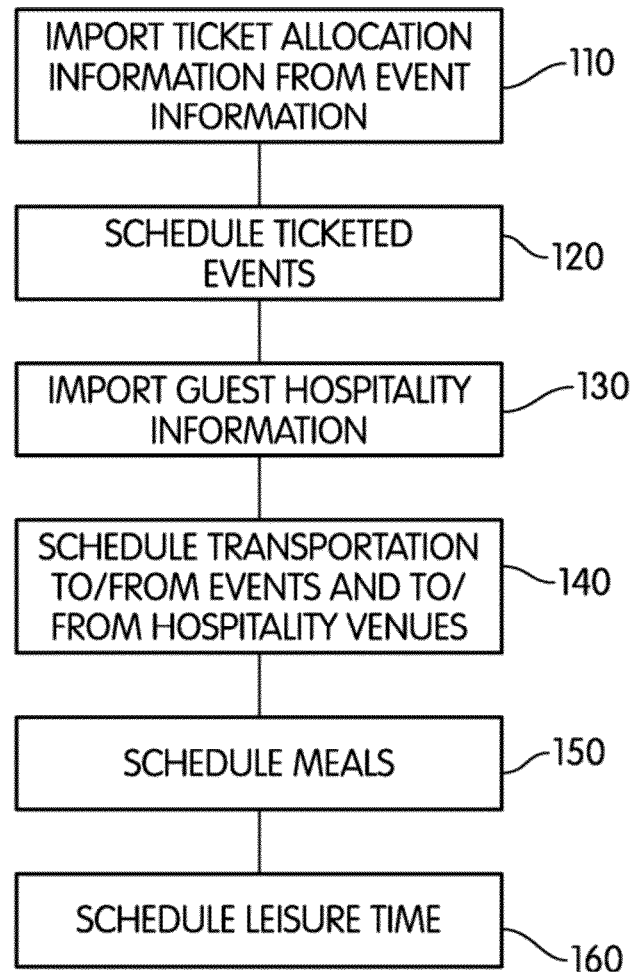
FIG. 4 is a flow chart for the method of performing program scheduling, according to an embodiment of the invention.

Turning to FIG. 4, the method for creating a program schedule is described. The first step in preparing a client's program schedule in the management system 2 is to import the ticket allocation from the event information. This insures accuracy of the ticket allocation in the program schedule. A program manager then arranges a schedule around the ticketed event, taking into considerations transfer times, security, specific desires of the client and individual guest accommodations. Hospitality information (e.g. hotel location, number of meal, transfer request) aids in creation of the schedule. Thus, after hospitality information has been imported, the transportation, then meals then leisure time may be scheduled sequentially as shown in steps 140, 150 and 160.

Returning to the main screen, the user may select an accommodations option. Doing so presents a user interface that provides information on rooms, room numbers, room type, and other room information. From this, the operator can assign guests to each particular room. A rooming list report may include a summary of the rooming lists, including pre- and post-extensions.

Each client group's room allocation is made available to the client and information regarding the accommodation manager assigned to the client is also made available. The accommodations manager allocates rooms to each guest of the client group. Room assignments may be based on guest preferences (e.g. non-smoking, handicapped, view, balcony, etc.). According to room block assigned to the client, the accommodations manager makes decisions on how best to assign the given rooms with respect to guest preferences.

Figure 21A:

Returning again to the main screen, the user may select the food and beverage option. This will cause a display of the user interface depicted, for example, in FIG. 21a. This screen shows a view of the catering hospitality schedule for the group. From this screen, the user can print a master catering schedule shown, for example, in FIG. 21b, print a master hospitality schedule shown, for example, in FIG. 21c or show a view of the food and beverage schedule by group as shown, for example, in FIG. 21a.

The food and beverage portion of the client hospitality program extracts meals from the program schedule and allows for selecting the menu, table configuration, linens, floral, wines, and other details for the meal within a record. Once completed the management system 2 sends, from the record, instruction for each meal to the hotel and/or restaurant, as well as management staff, insuring that those concerned may be aware of details of each meal event. A full report based on the final cost of the meals, sale price per meal is available to the client.

Figure 22A:

When the guest registration option is selected from the main screen, the user interface may display the information shown in FIG. 22a. This screen also enables an operator to add a new primary guest. If this option is selected, an add new guest dialogue box is presented for the operator to complete. Additional options from this user interface enable a program manager or group coordinator to select a primary guest registration form which is shown, for example, in FIG. 22b. Additionally, the user may select to print an accompanying guest registration form which is shown, for example, in FIG. 22c. Another option is for the user to print a guest list which displays the information shown, for example, in FIG. 22d. Additionally, the user may print a guest manifest.

The guest registration information is created in the management system 2 by a program manager for each program guest. The information includes individual records, logins, and passwords, for access to the on-line guest registrations system. An email may be sent to each guest inviting them to visit the on-line guest registration system, via a web link along with their personal login and password. The invitation is pre-formatted and generated by the management system. FIG. 17 is an example embodiment of a guest registration system. Guest my complete personal information including address, passport number, and nationality; arrival and departure information; guest preferences (e.g., food allergies, smoking rooms, etc); and accompanying guest information. This information can be submitted or amended by the client's program manager. Each subsequent time a guest access their on-line guest registration and makes any changes or addition to the information, the management system 2 automatically generates a notification (e.g., e-mail, instant message, etc.) to the program manager informing them of the additions/alterations that have been made by the guest. Once a guest has been entered in the guest registration system, their accommodations assignments can be made by the accommodations manager.

Figure 23A:

Returning again to the main screen, a transportation option enables the user to view and manage transportation information. As shown, for example, in FIG. 23a, the transportation screen enables a user to select a transportation schedule option which will display the transportation schedule as shown, for example, in FIG. 23b. Additionally, other transportation-related information can be viewed and/or managed through this portion of the interface.

The transportation section of the client program extracts transfer information from the program schedule to compile a complete transportation schedule for the vehicles assigned to the client program. The transportation schedule is also utilized for individual program management to communicate daily schedules to drivers and also by the transportation director to track movement of vehicles. Optionally, GPS devices on vehicles may also be tracked.

Returning to the main screen, the airport manifest option enables the user to select and cause to be displayed an airport manifest interface from which an airport manifest report can be printed. Additionally, the user may select a letter of operation option from the main screen which serves as a final communication to the hotel confirming the details of the program.

Airport manifest details flight information supplied by each guest in the guest registration system. Based on this information the management system 2 will generate a report for the arrival and departure complete with airport (or train station, bus station, or any other type of transportation hub), flight details, arrival and departure times, quantity of luggage etc. to assist the program manager and director with scheduling of staff and transfers.

The gift program allows each guest of the client group to be presented with gifts selected from a complete list of suggested items available on the management system, recommending suppliers and suggested gift schedules. Various collaterals (e.g., save the date cards, thank you notes) may be also included in the management system 2 along with recommended suppliers and sample text for each.

Returning again to the main screen, a local information icon may be presented to enable the user to view selected information regarding the location of the event. As shown, for example, in FIG. 24, a guide to Torino is displayed to enable additional information about that host city to be viewed. The city/event guide feature includes a comprehensive guide to the event, event host city, history of the event and/or interesting facts. The city guide may include maps and a description of local customs.

In conjunction with each client, a program manager establishes a letter of operations to serve as the master instruction guide to hotel, restaurants, and program staff. The letter details facets of the program, a brief outline of the client group, notable VIP's, special requests, billing instructions, along with the program schedule, meal schedule, and program management contact details. The letter of operations is posted on the client's homepage on the management system, which can be updated or amended as necessary, until a final version is ready to those parties concerned.

Returning again to the main screen, a staff option enables a user to select this option to see a list of the resumes and pictures of staff and to handle staff assignments for individual groups to the extent applicable. The staff section of the client program indicates the host who may be chosen to escort the guests throughout the hospitality program. Once selected and allocated to a specific client group, the host's resume, photo, and other relevant details may be posted on the client group's staff page, for the client to review and approve.

While the invention has been described primarily in connection with Olympic events, the invention is not so limited. Aspects of the invention may also be used in connection with hospitality programs (or other packages relating to other international or national sporting events (e.g., World Cup, World Series, Grand Prix, Superbowl, and other events). While aspects of the invention may primarily be directed to hospitality programs, various aspects of the invention may be used with other types of travel-related packages such as foreign travel, sightseeing tours, and/or corporate sponsored events.

In yet another alternative embodiment, the event management system 2 may be linked with airline inventory in order to provide travel arrangements in addition to hospitality arrangements.

We claim:

1. A computer-implemented method of facilitating event hospitality management for client groups and individual guests of the client groups attending a multi-day event that includes multiple ticketed sub-events per day, the method being implemented by a computer system that includes one or more physical processors executing one or more computer program instructions which, when executed, perform the method, the method comprising:

storing, by the one or more physical processors, third-party event inventory items that are at the disposal of a hospitality program provider, where the third-party event inventory items include lodging resources, transportation resources, and sub-event tickets that allow access to one or more ticketed sub-events of the multi-day event;

receiving, by the one or more physical processors, one or more first requests from a first one of the client groups for at least some of the third-party event inventory items;

managing, by the one or more physical processors, allocation of a first item subset of the third-party event inventory items to the first one of the client groups based on the one or more first requests, wherein the first item subset includes a first subset of the lodging resources, a first subset of the transportation resources, and a first subset of the sub-event tickets;

receiving, by the one or more physical processors, one or more second requests from the first one of the client groups to allocate individual lodging resources, transportation resources, and sub-event tickets of the first subsets of the lodging resources, the transportation resources, and the sub-event tickets to first individual guests of the first one of the client groups;

managing, by the one or more physical processors, allocation of the individual lodging resources, transportation resources, and sub-event tickets to the first individual guests based on the one or more second requests;

determining, during the multi-day event by the one or more physical processors, a change impacting one or more of the third-party event inventory items;

determining, by the one or more physical processors, a subset of individual guests that are impacted by the change, wherein the subset of individual guests include at least one of the first individual guests;

transmitting, during the multi-day event by the one or more physical processors, a notification regarding the change to devices associated with the subset of individuals guests;

modifying, by the one or more physical processors, event inventory items that are allocated to the subset of individual guests based on the change; and transmitting, during the multi-day event by the one or more physical processors, a notification regarding the modification to the devices.

2. The method of claim 1, further comprising:

providing, during the multi-day event by the one or more physical processors, event information to one or more devices of the first individual guests, wherein the event information relate to at least one of the individual lodging resources, transportation resources, and sub-event tickets; and providing, during the multi-day event by the one or more physical processors, updated event information to the one or more devices based on the determined change.

3. The method of claim 2, further comprising:
determining, by the one or more physical processors, preference information associated with the first individual guests,
wherein providing the event information comprises providing, by the one or more physical processors, the event information based on the determined preference information.

4. The method of claim 2, wherein the event information includes real-time event information, and the real-time event information includes one or more of event scores, video clips, current standings, daily schedules, transportation information, hospitality information, or hospitality arrangements.

5. The method of claim 2, wherein the one or more devices include one or more mobile devices, the method further comprising:
determining, by the one or more physical processors, a location of a mobile device of the one or more mobile devices;
wherein providing the event information comprises providing, by the one or more physical processors, the event information to the mobile device based on the determined location.

6. The method of claim 2, wherein determining the change comprises determining, during the multi-day event by the one or more physical processors, a scheduling change associated with at least one of the one or more ticketed sub-event, and wherein providing the updated event information comprises providing, during the multi-day event by the one or more physical processors, the updated event information based on the determined scheduling change.

7. The method of claim 2, wherein determining the change comprises determining, during the multi-day event by the one or more physical processors, a hospitality arrangement change, and wherein providing the updated event information during the event comprises providing, during the multi-day event by the one or more physical processors, the updated event information based on the determined hospitality arrangement change.

8. The method of claim 2, wherein the one or more ticketed sub-events includes a first sub-event of the multi-day event, the method further comprising:
determining, by the one or more physical processors, that a first guest of the first individual guests is at the first sub-event;
determining, by the one or more physical processors, a second sub-event of the multi-day event that is simultaneously occurring during a same period as the first sub-event; and
providing, by the one or more physical processors, other event information relating to the second sub-event while the first guest is at the first sub-event based on the determination that the first guest is at the first sub-event.

9. The method of claim 1, further comprising:
receiving, during the multi-day event by the one or more physical processors, a request from at least one of the first individual guests for one or more additional event inventory items.

10. The method of claim 1, further comprising:
providing, by the one or more physical processors, a user interface to enable an external participant that is authorized to act on behalf of the first one of the client groups to manage allocation of specific event inventory items that are allocated to the first one of the client groups to individual guests of the first one of the client groups,
wherein the one or more second requests are generated based on one or more selections, by the external participant via the user interface, that correspond to allocating the individual lodging resources, transportation resources, and sub-event tickets to the first individual guests.

11. The method of claim 1, wherein the one or more first requests include one or more accommodation parameters for the first one of the client groups, and wherein the allocation of the first item subset is based on the one or more accommodation parameters.

12. The method of claim 11, wherein the accommodation parameters include one or more of number of parties, budget, arrival time, departure time, event selections, or gifts requested.

13. A system for facilitating event hospitality management for client groups and individual guests of the client groups attending a multi-day event that includes multiple ticketed sub-events per day, the system including one or more physical processors executing one or more computer program instructions which, when executed, cause the one or more physical processors to:
store third-party event inventory items that are at the disposal of a hospitality program provider, where the third-party event inventory items include lodging resources, transportation resources, and sub-event tickets that allow access to one or more ticketed sub-events of the multi-day event;
receive one or more first requests from a first one of the client groups for at least some of the third-party event inventory items;
manage allocation of a first item subset of the third-party event inventory items to the first one of the client groups based on the one or more first requests, wherein the first item subset includes a first subset of the lodging resources, a first subset of the transportation resources, and a first subset of the sub-event tickets;
receive one or more second requests from the first one of the client groups to allocate individual lodging resources, transportation resources, and sub-event tickets of the first subsets of the lodging resources, the transportation resources, and the sub-event tickets to first individual guests of the first one of the client groups;
manage allocation of the individual lodging resources, transportation resources, and sub-event tickets to the first individual guests based on the one or more second requests;
determine, during the multi-day event, a change impacting one or more of the third-party event inventory items;
determine a subset of individual guests that are impacted by the change, wherein the subset of individual guests includes at least one of the first individual guests;
transmit, during the multi-day event, a notification regarding the change to devices associated with the subset of individuals guests;
modify event inventory items that are allocated to the subset of individual guests based on the change; and
transmit, during the multi-day event, a notification regarding the modification to the devices.

14. The system of claim 13, wherein the one or more physical processors are further caused to:
provide, during the multi-day event, event information to one or more devices of the first individual guests, wherein the event information relate to at least one of the individual lodging resources, transportation resources, and sub-event tickets; and provide, during the multi-day event, updated event information to the one or more devices based on the determined change.

15. The system of claim 14, wherein determining the change comprises determining, during the multi-day, a scheduling change associated with at least one of the one or more ticketed sub-event, and wherein providing the updated event information comprises providing, during the multi-day event, the updated event information based on the determined scheduling change.

16. The system of claim 14, wherein determining the change comprises determining, during the multi-day event, a hospitality arrangement change, and wherein providing the updated event information comprises providing, during the multi-day event, the updated event information based on the determined hospitality arrangement change.

17. The system of claim 14, wherein the one or more ticketed sub-events includes a first sub-event of the multi-day event, and wherein the one or more physical processors are further caused to:

determine that a first guest of the first individual guests is at the first sub-event;

determine a second sub-event of the multi-day event that is simultaneously occurring during a same period as the first sub-event; and provide other event information relating to the second sub-event while the first guest is at the first sub-event based on the determination that the first guest is at the first sub-event.

18. The system of claim 13, wherein the one or more physical processors are further caused to:

provide a user interface to enable an external participant that is authorized to act on behalf of the first one of the client groups to manage allocation of specific event inventory items that are allocated to the first one of the client groups to individual guests of the first one of the client groups, wherein the one or more second requests are generated based on one or more selections, by the external participant via the user interface, that correspond to allocating the individual lodging resources, transportation resources, and sub-event tickets to the first individual guests.

19. The system of claim 13, wherein the one or more first requests include one or more accommodation parameters for the first one of the client groups, and wherein the allocation of the first item subset is based on the one or more accommodation parameters.

20. The system of claim 19, wherein the accommodation parameters include one or more of number of parties, budget, arrival time, departure time, event selections, or gifts requested.

* * * * *